(12) United States Patent
Kawai et al.

(10) Patent No.: US 9,600,888 B2
(45) Date of Patent: Mar. 21, 2017

(54) IMAGE PROCESSING DEVICE, IMAGE PROCESSING METHOD, AND PROGRAM

(71) Applicant: Sony Corporation, Tokyo (JP)

(72) Inventors: Takuro Kawai, Tokyo (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/426,478

(22) PCT Filed: Jun. 12, 2013

(86) PCT No.: PCT/JP2013/066150
§ 371 (c)(1),
(2) Date: Mar. 6, 2015

(87) PCT Pub. No.: WO2014/041860
PCT Pub. Date: Mar. 20, 2014

(65) Prior Publication Data
US 2015/0227779 A1    Aug. 13, 2015

(30) Foreign Application Priority Data

Sep. 14, 2012  (JP) ................ 2012-203292

(51) Int. Cl.
*G06T 7/00*    (2006.01)
*G06T 15/20*   (2011.01)
(Continued)

(52) U.S. Cl.
CPC ........ *G06T 7/0075* (2013.01); *G06K 9/00201* (2013.01); *G06K 9/4604* (2013.01);
(Continued)

(58) Field of Classification Search
None
See application file for complete search history.

(56) References Cited

U.S. PATENT DOCUMENTS 6,064,775 A      5/2000   Suzuki et al.
6,157,733 A  *  12/2000   Swain ................ G06T 15/02
                                                          382/154
(Continued)

FOREIGN PATENT DOCUMENTS

JP    10-243240 A    9/1998
JP    2006-221403 A  8/2006
(Continued)

*Primary Examiner* — Kim Vu
*Assistant Examiner* — Nathan Bloom
(74) *Attorney, Agent, or Firm* — Chip Law Group

(57) ABSTRACT

A plurality of processes for emphasizing a stereoscopic effect of an image is supposed and a plurality of stereoscopic effect emphasis processes is integrated in a mode suitable for the image.

An image processing device is provided with a stereoscopic effect emphasis processing unit and an integration processing unit. The stereoscopic effect emphasis processing unit executes a plurality of stereoscopic effect emphasis processes on an input image. The integration processing unit integrates results of a plurality of stereoscopic effect emphasis processes according to an integration coefficient used when a plurality of stereoscopic effect emphasis processes is integrated obtained by analyzing the input image. This may be further provided with an image analyzing unit which analyzes the input image to generate the integration coefficient used when a plurality of stereoscopic effect emphasis processes is integrated.

14 Claims, 28 Drawing Sheets

(51) Int. Cl.
   *H04N 13/00*   (2006.01)
   *G06K 9/00*    (2006.01)
   *G06K 9/46*    (2006.01)
   *G06T 5/00*    (2006.01)

(52) U.S. Cl.
   CPC .............. *G06T 5/003* (2013.01); *G06T 5/006* (2013.01); *G06T 5/008* (2013.01); *G06T 15/20* (2013.01); *H04N 13/0018* (2013.01); *H04N 13/0022* (2013.01); *G06T 2207/10012* (2013.01); *G06T 2207/10021* (2013.01); *H04N 2013/0074* (2013.01)

(56) References Cited

U.S. PATENT DOCUMENTS

| | | | |
|---|---|---|---|
| 2006/0291741 | A1 | 12/2006 | Gomi et al. |
| 2008/0002910 | A1* | 1/2008 | Ojima ................... G06T 15/00 382/277 |
| 2008/0273027 | A1* | 11/2008 | Feremans .......... H04N 13/0018 345/419 |
| 2009/0033662 | A1* | 2/2009 | Murrah .................. G06T 15/50 345/426 |
| 2010/0119149 | A1* | 5/2010 | Hong .................... H04N 9/643 382/167 |
| 2010/0260419 | A1* | 10/2010 | Katoh ...................... H04N 1/60 382/167 |
| 2011/0316984 | A1* | 12/2011 | Akeley ............. H04N 13/0022 348/51 |
| 2012/0133747 | A1* | 5/2012 | Takahashi .......... H04N 13/0018 348/51 |
| 2012/0154517 | A1* | 6/2012 | Um ........................ H04N 13/02 348/14.16 |
| 2012/0176473 | A1* | 7/2012 | Genova ............. H04N 13/0011 348/46 |
| 2013/0127837 | A1* | 5/2013 | Hyodo ................ H04N 13/0022 345/419 |
| 2013/0294683 | A1* | 11/2013 | Yamashita ......... H04N 13/0018 382/154 |

FOREIGN PATENT DOCUMENTS

| | | |
|---|---|---|
| JP | 2009-053748 A | 3/2009 |
| JP | 2010-154422 A | 7/2010 |

* cited by examiner

IMAGE

DEPTH

FIG. 15

| ‹STEREOSCOPIC EFFECT EMPHASIS PROCESS› | ‹SCENE› | | |
|---|---|---|---|
| | LANDSCAPE | STRUCTURE, STREET AND THE LIKE | PORTRAIT |
| RELATIVE SIZE | w1 | w1 | w1 |
| PERSPECTIVE | w2 | w2 | w2 |
| MOTION | w3 | w3 | w3 |
| AERIAL PERSPECTIVE | w4 | w4 | w4 |
| TEXTURE GRADIENT | w5 | w5 | w5 |
| SHADING | w6 | w6 | w6 |
| FOCUS | w7 | w7 | w7 |

142

IMAGE PROCESSING DEVICE, IMAGE PROCESSING METHOD, AND PROGRAM

TECHNICAL FIELD

The present technology relates to an image processing device which emphasizes a stereoscopic effect of an image. More specifically, this relates to an image processing device which integrates a plurality of stereoscopic effect emphasis processing results, an image display device, a processing method thereof, and a program which allows a computer to execute the method.

BACKGROUND ART

Popularization of digital still cameras makes end users familiar with imaging everyday scenes. Because of a short focal distance of the digital still camera, an imaged image is sometimes planar and lacks a stereoscopic effect.

Therefore, technology of calculating a subject distance and shading or blurring based on this is suggested in order to emphasize a stereoscopic effect in a stereoscopic image in which two persons are made common subjects of interest of right and left eyes (for example, refer to Patent Document 1).

CITATION LIST

Patent Document

Patent Document 1: JP 2009-53748 A

SUMMARY OF THE INVENTION

Problems to be Solved by the Invention

In the above-described conventional technology, the stereoscopic effect of a planar shallow image is enhanced by stereoscopic distance measurement by using the stereoscopic image and a process to make the image look like deep based on this. However, the stereoscopic image formed of the images of the right and left eyes is supposed in this conventional technology, so that it takes time to calculate the subject distance. Furthermore, it is not yet studied how to combine a plurality of stereoscopic effect emphasis processes such as the shading and blurring.

The present technology is achieved in view of such situations and an object thereof is to suppose a plurality of processes for emphasizing the stereoscopic effect of the image and integrating a plurality of stereoscopic effect emphasis processes in a mode suitable for the image.

Solutions to Problems

This technology is achieved for solving the above-described problems and a first aspect thereof is an image processing device provided with a stereoscopic effect emphasis processing unit which executes a plurality of stereoscopic effect emphasis processes on an input image, and an integration processing unit which integrates results of the plurality of stereoscopic effect emphasis processes according to an integration coefficient used when the plurality of stereoscopic effect emphasis processes is integrated obtained by analyzing the input image, an image processing method thereof or a program. This has an effect of integrating a plurality of stereoscopic effect emphasis processes in a mode suitable for the image. It is also possible that the first aspect is further provided with an image analyzing unit which analyzes the input image to generate the integration coefficient used when the plurality of stereoscopic effect emphasis processes is integrated.

In the first aspect, the image analyzing unit may also generate the integration coefficient based on a scene of the input image. This has an effect of integrating a plurality of stereoscopic effect emphasis processes based on scene recognition.

In the first aspect, the image analyzing unit may also generate the integration coefficient based on the recognized scene and a feature amount included in the input image. This has an effect of integrating a plurality of stereoscopic effect emphasis processes based on the scene recognition and the feature amount.

In the first aspect, when the integration coefficients of the stereoscopic effect emphasis process to control a relative size and the stereoscopic effect emphasis process to perform positional control based on perspective are higher than predetermined thresholds, the image analyzing unit may further increase the integration coefficient of the stereoscopic effect emphasis process to perform the positional control. This has an effect of emphasizing a stereoscopic effect of a deep image.

In the first aspect, when the integration coefficients of the stereoscopic effect emphasis process to emphasize a texture gradient and the stereoscopic effect emphasis process according to a focus are higher than predetermined thresholds, the image analyzing unit may further increase the integration coefficients of the stereoscopic effect emphasis process to emphasize the texture gradient and the stereoscopic effect emphasis process according to the focus. This has an effect of emphasizing the stereoscopic effect of the image with a sharp texture gradient.

In the first aspect, the image analyzing unit may inhibit a lower integration coefficient of the integration coefficient of the stereoscopic effect emphasis process based on aerial perspective and the integration coefficient of the stereoscopic effect emphasis process by shading. This has an effect of emphasizing the stereoscopic effect while giving priority to any one of the stereoscopic effect emphasis process based on the aerial perspective and the stereoscopic effect emphasis process by shading.

In the first aspect, the image analyzing unit may inhibit a lower integration coefficient of the integration coefficient of the stereoscopic effect emphasis process by shading and the integration coefficient of the stereoscopic effect emphasis process to emphasize the texture gradient or the integration coefficient of the stereoscopic effect emphasis process according to the focus. This has an effect of emphasizing the stereoscopic effect while considering an arrangement of an object.

In the first aspect, the image analyzing unit may inhibit a lower integration coefficient of the integration coefficient of the stereoscopic effect emphasis process based on the aerial perspective and the integration coefficient of the stereoscopic effect emphasis process to control the relative size or the integration coefficient of the stereoscopic effect emphasis process to perform the positional control based on the perspective. This has an effect of emphasizing the stereoscopic effect while considering an angle of view.

In the first aspect, the integration processing unit may separately perform integration of the stereoscopic effect emphasis processes regarding a position and integration of the stereoscopic effect emphasis processes regarding a pixel value of the plurality of stereoscopic effect emphasis processes in order. This has an effect of combining the stereoscopic effect emphasis processes of different types.

A second aspect of the present technology is an image display device provided with a stereoscopic effect emphasis processing unit which executes a plurality of stereoscopic effect emphasis processes on an input image, an integration processing unit which integrates results of the plurality of stereoscopic effect emphasis processes according to an integration coefficient used when the plurality of stereoscopic effect emphasis processes is integrated obtained by analyzing the input image, and a display unit which displays an image obtained by integrating the results of the plurality of stereoscopic effect emphasis processes in the input image. This has an effect of displaying the image while integrating a plurality of stereoscopic effect emphasis processes in a mode suitable for the image.

Effects of the Invention

The present technology may have an excellent effect of supposing a plurality of processes for emphasizing the stereoscopic effect of the image and integrating a plurality of stereoscopic effect emphasis processes in a mode suitable for the image.

BRIEF DESCRIPTION OF DRAWINGS

FIG. 15 is a view illustrating a configuration example of a binding coefficient table 142 of the embodiment of the present technology.

MODE FOR CARRYING OUT THE INVENTION

A mode for carrying out the present technology (hereinafter, referred to as an embodiment) is hereinafter described. Note that the description is given in the following order.
1. Entire Configuration (Application Example to Image Display Device)
2. Stereoscopic Effect Emphasis Process
3. Image Analysis (Generation of Integration Coefficient)
4. Integration Process
5. Entire Operation

1. Entire Configuration

Configuration of Image Display Device

Figure 1:
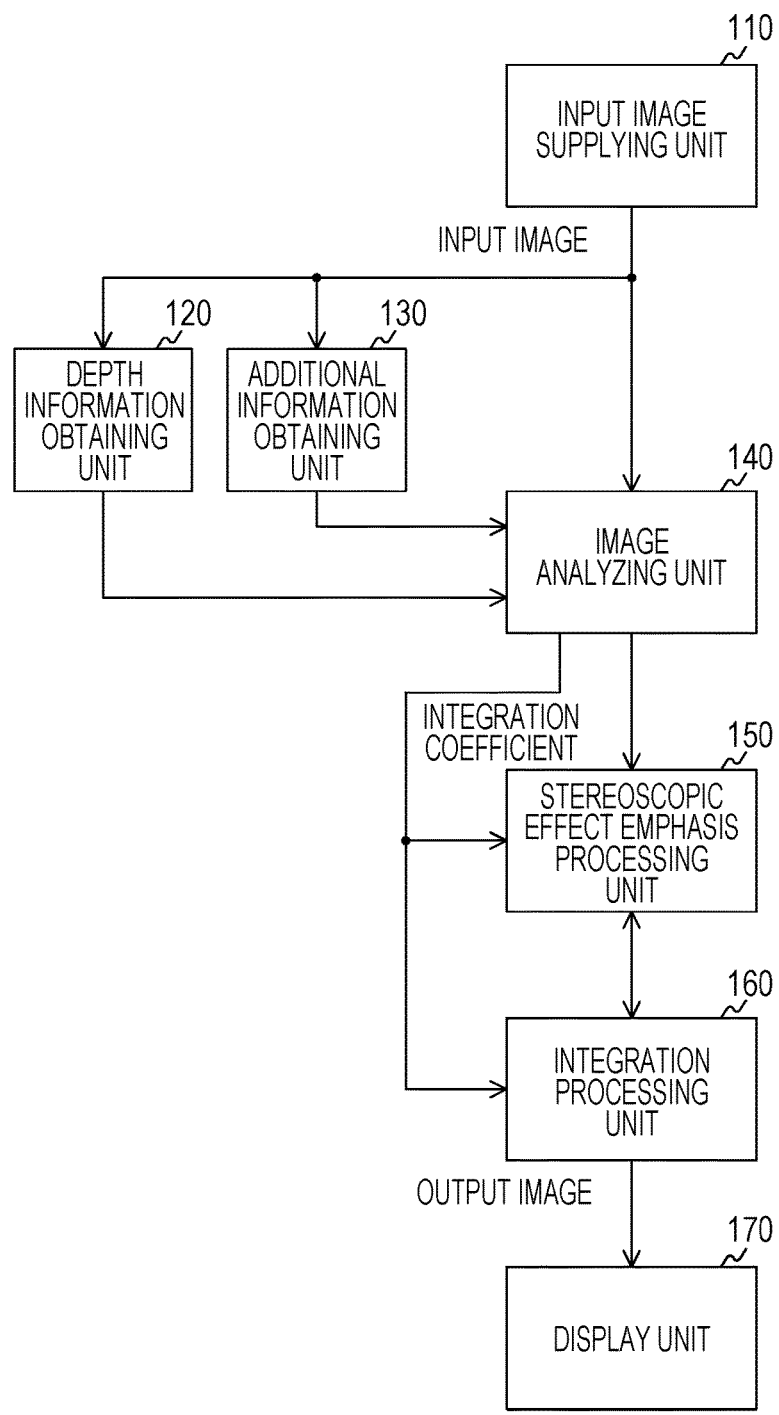
FIG. 1 is a view illustrating a configuration example of an image display device of an embodiment of the present technology.

FIG. 1 is a view illustrating a configuration example of an image display device of an embodiment of the present technology. The image display device is provided with an input image supplying unit 110, a depth information obtaining unit 120, an additional information obtaining unit 130, an image analyzing unit 140, a stereoscopic effect emphasis processing unit 150, an integration processing unit 160, and a display unit 170.

The input image supplying unit 110 is configured to supply an input image. An imaging device which images a subject to generate an imaged image, an image server which outputs an image selected from saved images and the like, for example, supposedly serve as the input image supplying unit 110. The input image supplying unit 110 may supply depth information and additional information corresponding to the input image together with the input image.

The depth information obtaining unit 120 is configured to obtain the depth information corresponding to the input image unit. The depth information is the information indicating a depth of each pixel forming the input image. The depth information supplied from the input image supplying unit 110 may be used. The depth information generated by a unit other than the input image supplying unit 110 may also be obtained. The depth information obtaining unit 120 may also generate the depth information from the input image.

The additional information obtaining unit 130 is configured to obtain the additional information corresponding to the input image. The additional information is an image feature amount and a control parameter used by the image analyzing unit 140. The additional information supplied from the input image supplying unit 110 may be used. The additional information generated by a unit other than the input image supplying unit 110 may also be obtained. The additional information obtaining unit 130 may also generate the additional information from the input image.

The image analyzing unit 140 is configured to analyze the input image to generate an integration coefficient used when a plurality of stereoscopic effect emphasis processes is integrated. The integration coefficient is supplied to the stereoscopic effect emphasis processing unit 150 and the integration processing unit 160. The integration coefficient is described later in detail.

The stereoscopic effect emphasis processing unit 150 is configured to execute a plurality of stereoscopic effect emphasis processes on the input image. The stereoscopic effect emphasis processing unit 150 receives the input image supplied from the input image supplying unit 110 and the depth information obtained by the depth information obtaining unit 120 from the image analyzing unit 140 and applies a plurality of stereoscopic effect emphasis processes according to the integration coefficient supplied from the image analyzing unit 140.

The integration processing unit 160 is configured to integrate results of a plurality of stereoscopic effect emphasis processes executed by the stereoscopic effect emphasis processing unit 150 according to the integration coefficient supplied from the image analyzing unit 140. The integration processing unit 160 outputs an integrated result as an output image.

The display unit 170 is configured to display the output image output from the integration processing unit 160. The display unit 170 may be realized by an LCD (liquid crystal display) and the like, for example.

Meanwhile, although the configuration example of the image display device including the display unit 170 is herein described, an image processing device without the display unit 170 may also be configured.

2. Stereoscopic Effect Emphasis Process

Configuration of Stereoscopic Effect Emphasis Processing Unit

Figure 2:
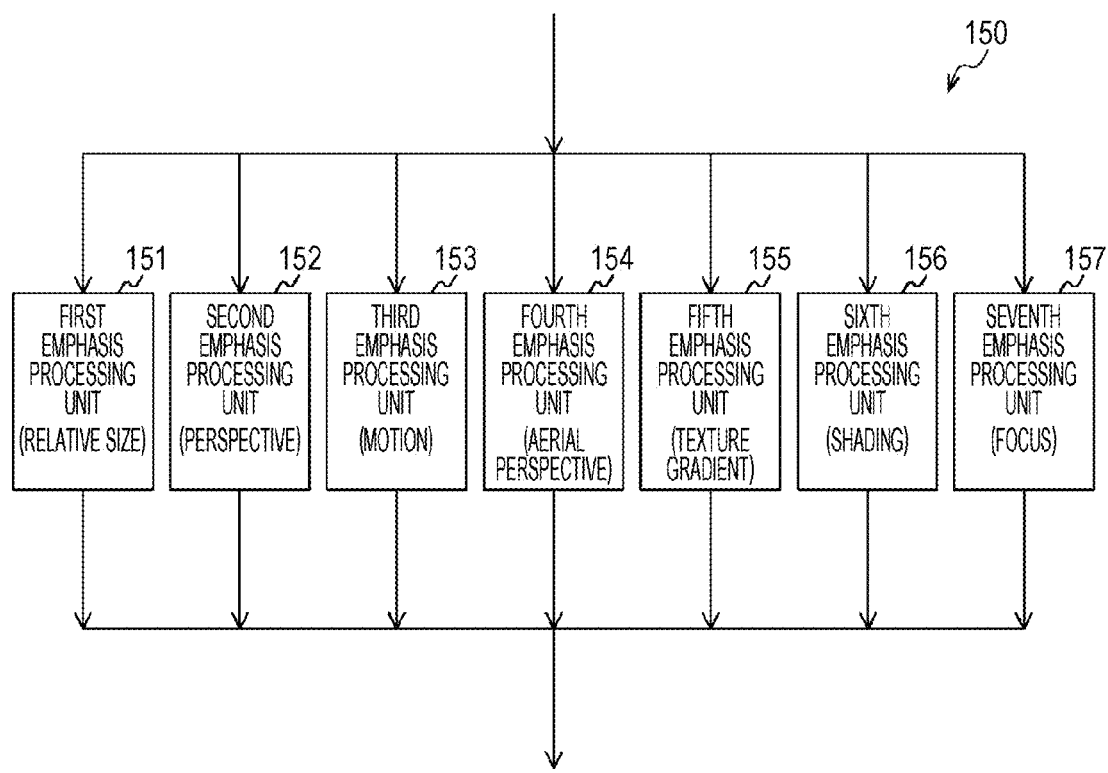
FIG. 2 is a view illustrating a configuration example of a stereoscopic effect emphasis processing unit 150 of the embodiment of the present technology.

FIG. 2 is a view illustrating a configuration example of the stereoscopic effect emphasis processing unit 150 of the embodiment of the present technology. The stereoscopic effect emphasis processing unit 150 is provided with processing units which perform seven types of stereoscopic effect emphasis processes.

That is to say, a first emphasis processing unit 151 is configured to perform the stereoscopic effect emphasis process to control a relative size. A second emphasis processing unit 152 is configured to perform the stereoscopic effect emphasis process to perform positional control based on perspective. A third emphasis processing unit 153 is configured to perform the stereoscopic effect emphasis process to control motion (depth from motion) of an object. A fourth emphasis processing unit 154 is configured to perform the stereoscopic effect emphasis process based on aerial perspective. A fifth emphasis processing unit 155 is configured to perform the stereoscopic effect emphasis process to emphasize a texture gradient. A sixth emphasis processing unit 156 is configured to perform the stereoscopic effect emphasis process by shading. A seventh emphasis processing unit 157 is configured to perform the stereoscopic effect emphasis process according to a focus. Hereinafter, each of the stereoscopic effect emphasis processes is described.

First Emphasis Processing Unit (Relative Size)

Figure 3:
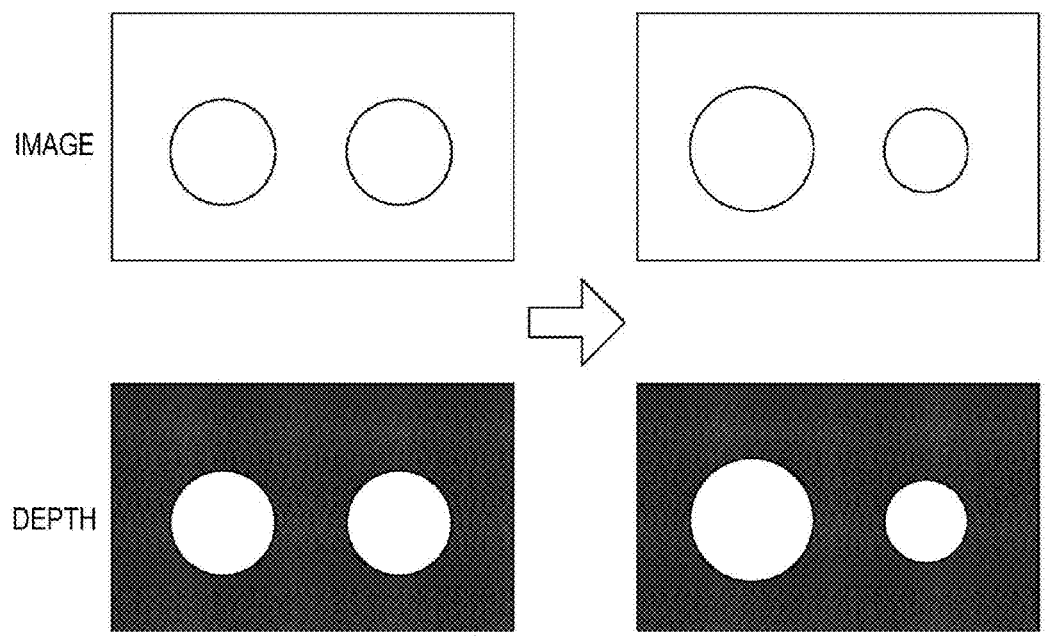
FIG. 3 is a view illustrating an example of a stereoscopic effect emphasis process to control relative sizes of objects by a first emphasis processing unit 151 of the embodiment of the present technology.

FIG. 3 is a view illustrating an example of the stereoscopic effect emphasis process to control the relative sizes of the objects by the first emphasis processing unit 151 of the embodiment of the present technology. In the stereoscopic effect emphasis process, the image is segmented into respective regions. At the time of the segmentation, a mean shift method, a graph cut method and the like are used, for example. The depth information for each region is referred to and a foreground region (foreground object) located on a front side is extracted as a region to be processed. When the region to be processed is extracted, it is possible to use an object recognition algorithm such as an SVM (support vector machine) method and a boosting method for improving accuracy. In the stereoscopic effect emphasis process, a size of the foreground region is made relatively large as illustrated in the drawing, and according to this, a stereoscopic effect is emphasized. A scaling factor at that time may be obtained from the depth.

When there is a plurality of foreground regions, two regions to be processed such as the nearest region and the second nearest region out of the foreground regions, for example, are obtained and an enlarging process is applied to a near region and a reducing process is applied to a far region. According to this, it becomes possible to emphasize a sense of distance in a depth direction between the two regions. Herein, at the time of the enlarging process and the reducing process, a bicubic method, a Lanczos method and the like are used, for example. The enlarging process and the reducing process may be performed on each of the two regions or on any one of the regions. When there is one foreground region, the similar process is performed on the foreground region and a background region.

In the stereoscopic effect emphasis process, when the size of the foreground region is changed in the image, it is necessary to change a pixel position in the depth information together by performing the enlarging process and the reducing process on the depth information as on the image as illustrated in the drawing.

Second Emphasis Processing Unit (Perspective)

Figure 4:
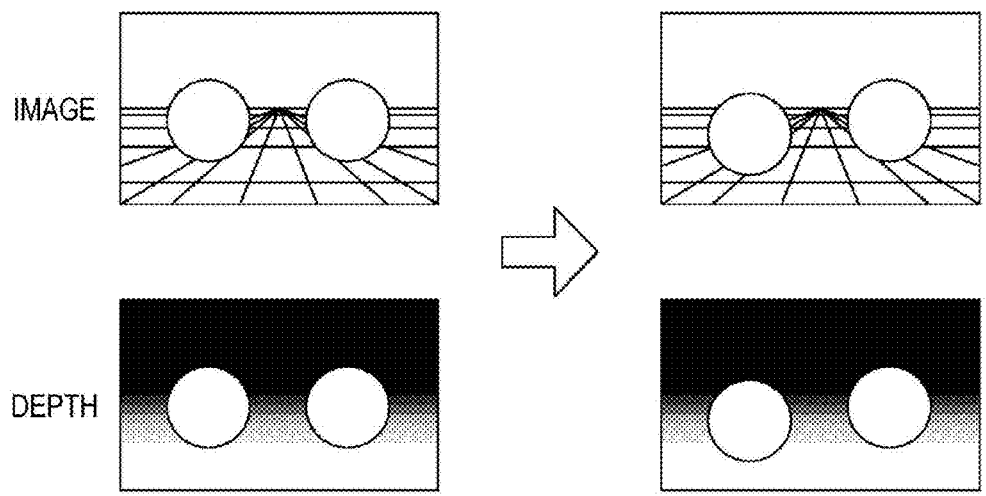
FIG. 4 is a view illustrating an example of the stereoscopic effect emphasis process to control a position of the object based on perspective by a second emphasis processing unit 152 of the embodiment of the present technology.

FIG. 4 is a view illustrating an example of the stereoscopic effect emphasis process to control a position of the object based on the perspective by the second emphasis processing unit 152 of the embodiment of the present technology. In the stereoscopic effect emphasis process, a horizontal line and a vanishing point in the image are detected and an intersection thereof is obtained to set a reference of the depth. Herein, it is possible to use Hough transform, for example, for detecting a straight line. As in the stereoscopic effect emphasis process by the first emphasis processing unit 151, the image is segmented into the respective regions. At the time of the segmentation, a mean shift method, a graph cut method and the like are used, for example. The depth information for each region is referred to and a foreground region (foreground object) located on a front side is extracted as a region to be processed. When the region to be processed is extracted, it is possible to use an object recognition algorithm such as an SVM (support vector machine) method and a boosting method for improving accuracy.

In the stereoscopic effect emphasis process, as for the foreground region to be processed, the position of the foreground region is moved in a direction of the straight line passing through a barycentric coordinate of the foreground region and a coordinate of the vanishing point based on the vanishing point, for example, as illustrated in the drawing. That is to say, the foreground region is moved such that this comes near when this moves outward from the vanishing point and this goes far when this moves toward the vanishing point. A motion amount at that time may be obtained from the depth.

In this stereoscopic effect emphasis process, when the position of the foreground region is moved in the image, it is necessary to change the pixel position in the depth information together by moving the position of the foreground region in the depth information as in the image as illustrated in the drawing.

Third Emphasis Processing Unit (Motion of Object)

Figure 5:
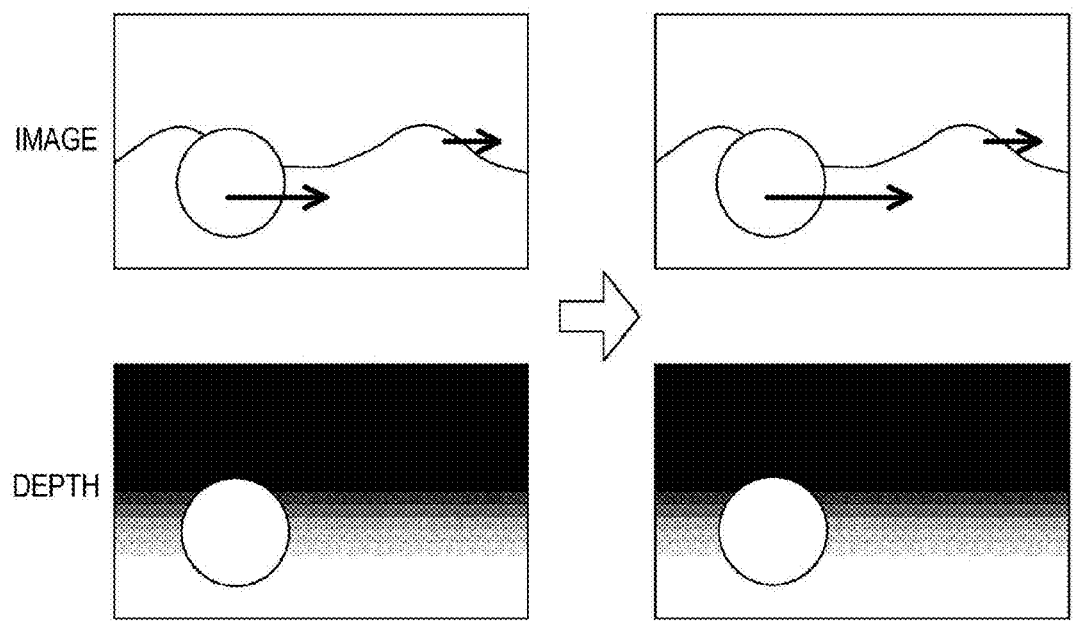
FIG. 5 is a view illustrating an example of the stereoscopic effect emphasis process to control motion of the object by a third emphasis processing unit 153 of the embodiment of the present technology.

FIG. 5 is a view illustrating an example of the stereoscopic effect emphasis process to control the motion of the object by the third emphasis processing unit 153 of the embodiment of the present technology. In the stereoscopic effect emphasis process, a motion vector is obtained from the image. The image is segmented into the respective regions. At the time of the segmentation, the mean shift method, the graph cut method, and a method of collecting the motion vectors having the same direction and the same size are used, for example. The depth information for each region is referred to and a foreground region (foreground object) located on a front side is extracted as a region to be processed. Thereafter, a representative vector is obtained by obtaining an average value and the like for each segmented region.

In the stereoscopic effect emphasis process, the sense of distance is controlled by adjustment of difference in size between the representative vector of the foreground region and that of the background region. For example, the sense of distance between the foreground and the background is emphasized by adjustment of a motion amount of the foreground such that a difference value becomes larger. On the other hand, the sense of distance between the foreground and the background is inhibited by the adjustment of the motion amount of the foreground such that the difference value becomes smaller. A change amount at that time may be obtained from the depth.

Fourth Emphasis Processing Unit (Aerial Perspective)

Figure 6:
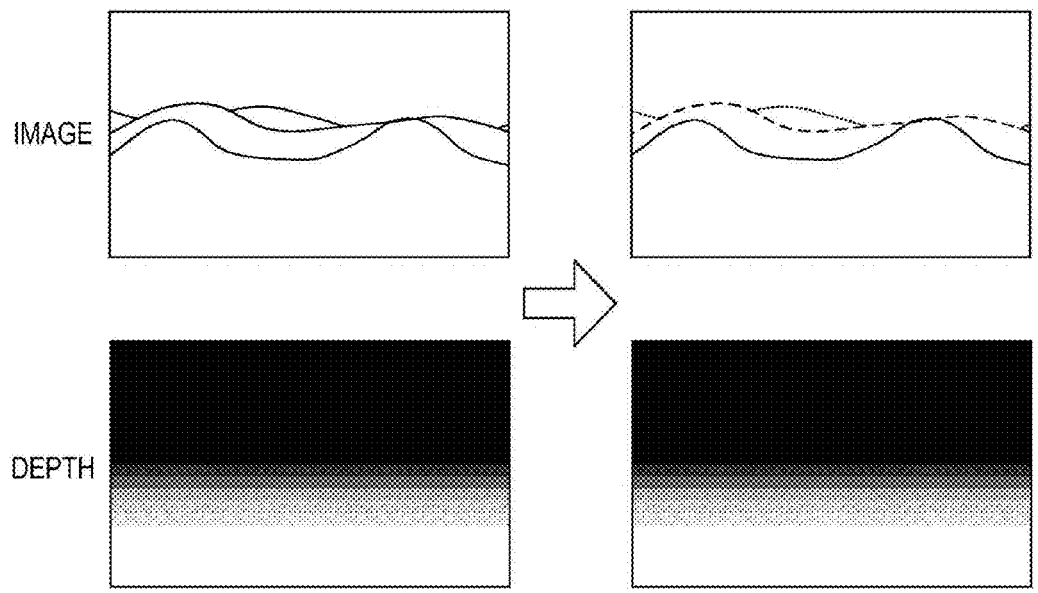
FIG. 6 is a view illustrating an example of the stereoscopic effect emphasis process based on aerial perspective by a fourth emphasis processing unit 154 of the embodiment of the present technology.

FIG. 6 is a view illustrating an example of the stereoscopic effect emphasis process based on the aerial perspective by the fourth emphasis processing unit 154 of the embodiment of the present technology. In the stereoscopic effect emphasis process, a distant view is blurred or saturation of the distant view is decreased to control a sense of depth.

First, it is determined whether the image may be subject to the stereoscopic effect emphasis process. A landscape image is a typical example thereof. Therefore, when an area of the color of the sky included in an upper third area of the image is not smaller than a threshold or when a green region included in the image is not smaller than a threshold, for example, it is determined that the image may be subject to the stereoscopic effect emphasis process. A case in which brightness is higher than a threshold th_y and the color is lower than thresholds th_r and th_g of R and G, respectively, are detected for YCbCr and RGB in order to determine the color of the sky. The green region is similarly determined.

When it is determined that the image may be subject to the stereoscopic effect emphasis process, a process of decreasing the saturation (Cb and Cr) more in an upper side in a vertical direction of the image and a process of blurring the distant view by a Gaussian filter and the like are applied.

Figure 7:
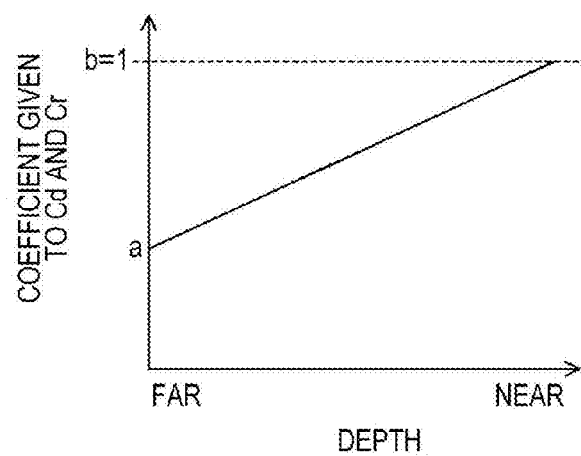
FIG. 7 is a view illustrating a relationship between a depth and saturation in the stereoscopic effect emphasis process based on the aerial perspective by the fourth emphasis processing unit 154 of the embodiment of the present technology.

It is also possible to perform the process of decreasing the saturation of the distant view and the process of blurring the distant view based on the depth information as illustrated in FIG. 7. In this case, when it is indicated that the depth is greater than a threshold, the depth may be determined to be that of the distant view.

Fifth Emphasis Processing Unit (Texture Gradient)

Figure 8:
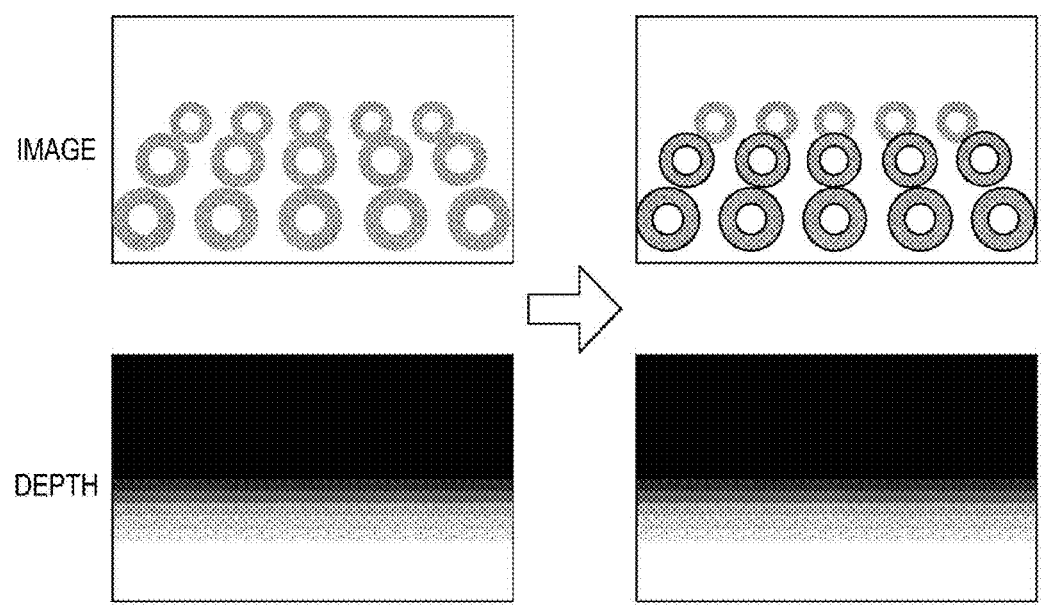
FIG. 8 is a view illustrating an example of the stereoscopic effect emphasis process to emphasize a texture gradient by a fifth emphasis processing unit 155 of the embodiment of the present technology.

FIG. 8 is a view illustrating an example of the stereoscopic effect emphasis process to emphasize the texture gradient by the fifth emphasis processing unit 155 of the embodiment of the present technology. In the stereoscopic effect emphasis process, a texture is first detected. The texture may be obtained by a region expanding method by using a size and a direction of an edge in an edge detection result, density in horizontal/vertical N taps and the like as feature amounts, for example. In the region expanding method, a label is assigned to each pixel by using the feature amount in each pixel as density of the texture.

Out of the obtained textures, the texture of a near view is sharpened by application of an unsharp mask or by addition of a high frequency component obtained from a high-pass filter. The texture of the distant view is dulled by the Gaussian filter and the like. For example, if a large depth value and a small depth value are those of the near view and the distant view, respectively, when the depth value is not smaller than a threshold th1, the process for the near view is performed considering that the value is that of the near view and when this is not larger than a threshold th2, the process for the distant view is performed considering that the value is that of the distant view. When the depth value is between the thresholds th1 and th2, a coefficient to be multiplied by a near view processing result and a distant view processing result is obtained by linear compensation using th1, th2, and the depth value and the near view processing result and the distant view processing result are blended.

Sixth Emphasis Processing Unit (Shading)

Figure 9:
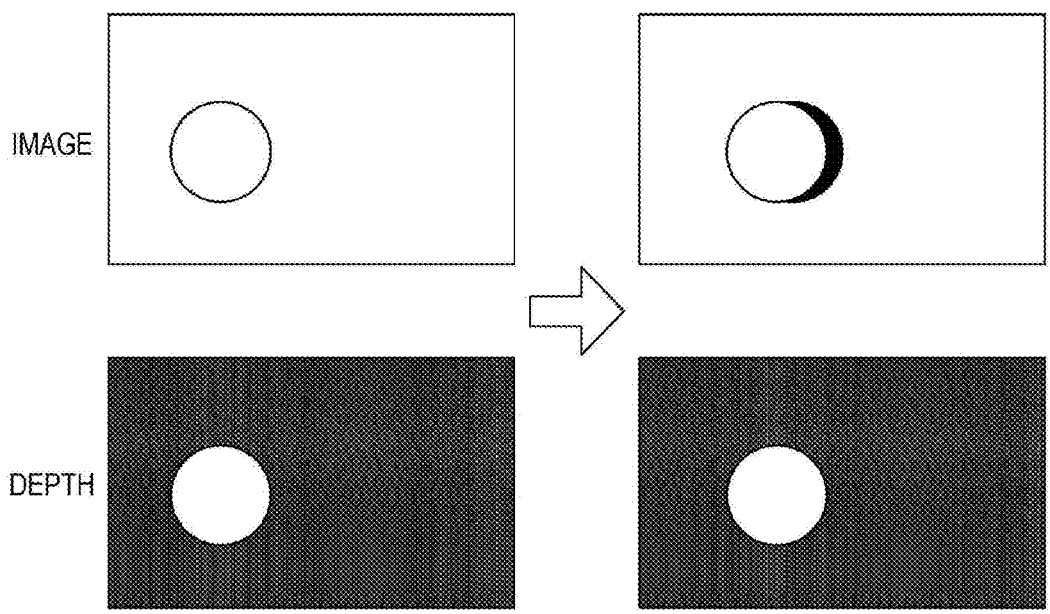
FIG. 9 is a view illustrating an example of the stereoscopic effect emphasis process by shading by a sixth emphasis processing unit 156 of the embodiment of the present technology.

FIG. 9 is a view illustrating an example of the stereoscopic effect emphasis process by shading by the sixth emphasis processing unit 156 of the embodiment of the present technology. In the stereoscopic effect emphasis process, a portion with unevenness of the depth is shaded. In the stereoscopic effect emphasis process, a light source is estimated and it is specified from where the light is applied (top, bottom, right, and left of the image). A region in which change in depth between the foreground and the background is large is detected by using the depth information and it is determined whether this is a region shaded according to an estimated direction of the light. At that time, a region in which a sum of absolute difference of depth is not smaller than a threshold in the horizontal/vertical N taps in a spatial direction becomes a detection target.

In the stereoscopic effect emphasis process, the brightness of the region determined to be the shaded region by the above-described process is inhibited. For example, this is more inhibited as brightness contrast at a boundary between the foreground and the background of the image is higher, and this is less inhibited as the brightness contrast is lower. Alternatively, this is less inhibited when the change in the depth between the foreground and the background is small, and this is more inhibited considering that it is more deeply shaded when the change in depth is larger. At that time, the change in depth between the foreground and the background may be calculated as the sum of absolute difference of depth in the horizontal/vertical N taps in the spatial direction.

Seventh Emphasis Processing Unit (Focus)

Figure 10:
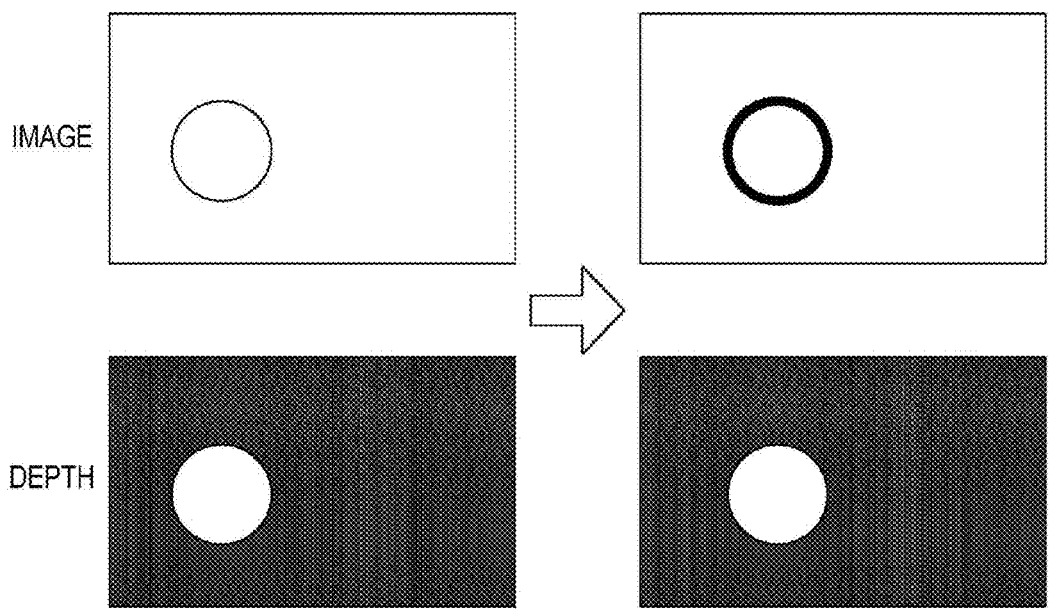
FIG. 10 is a view illustrating an example of the stereoscopic effect emphasis process according to a focus by a seventh emphasis processing unit 157 of the embodiment of the present technology.

FIG. 10 is a view illustrating an example of the stereoscopic effect emphasis process according to the focus by the seventh emphasis processing unit 157 of the embodiment of the present technology. In the stereoscopic effect emphasis process, an enhancement process is applied to a focused portion.

A region with a high spatial frequency obtained by FFT and the like is estimated to be in focus, that is to say, the near view. On the other hand, a region with a low spatial frequency is estimated to be out of focus, that is to say, the distant view. A blurred portion is excluded though this is in the foreground. Furthermore, the near view is separated from the distant view based on the depth information. In this case, a histogram of the depth information is generated, for example, and a mountain located on a far side is made the distant view and a mountain located on a near side is made the near view. The region with the high spatial frequency and the near view portion obtained from the depth information are made the region in focus.

It is possible to emphasize the stereoscopic effect of the near view by emphasizing the edge and the texture by applying the unsharp mask and by adding the high-frequency component obtained by the high-pass filter to the near view. When the large depth value and the small depth value are those of the near view and the far view, respectively, a degree of emphasis is made larger as the depth value is larger.

In this manner, existing technology may be used in each of a plurality of stereoscopic effect emphasis processes by the stereoscopic effect emphasis processing unit 150.

3. Image Analysis (Generation of Integration Coefficient)

First Configuration Example of Image Analyzing Unit

Figure 11:
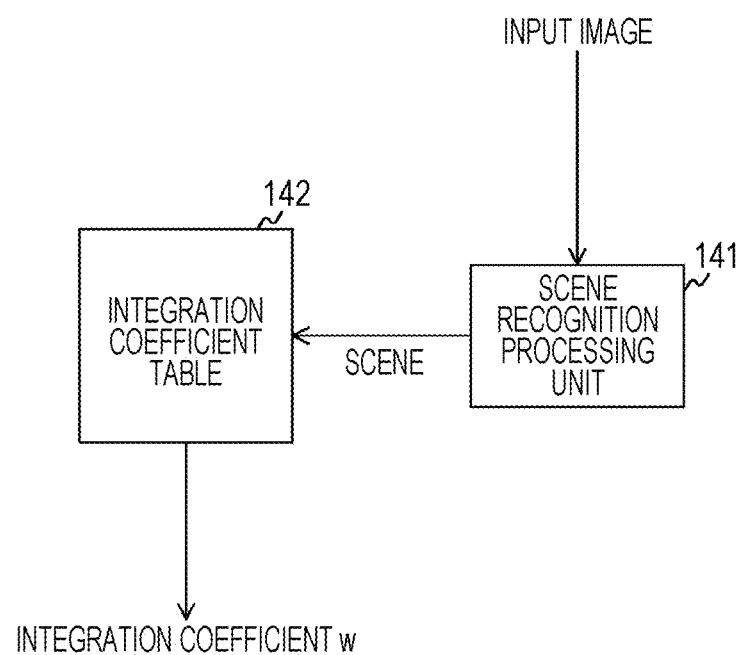
FIG. 11 is a view illustrating a first configuration example of an image analyzing unit 140 of the embodiment of the present technology.

FIG. 11 is a view illustrating a first configuration example of the image analyzing unit 140 of the embodiment of the present technology. The first configuration example of the image analyzing unit 140 is provided with a scene recognition processing unit 141 and a binding coefficient table 142.

The scene recognition processing unit 141 is configured to recognize a scene estimated from the input image. Although various scenes of the image may be considered, three representative scenes of a landscape; a structure, a street and the like; and a portrait are supposed in this embodiment as described hereinafter.

Figure 12:
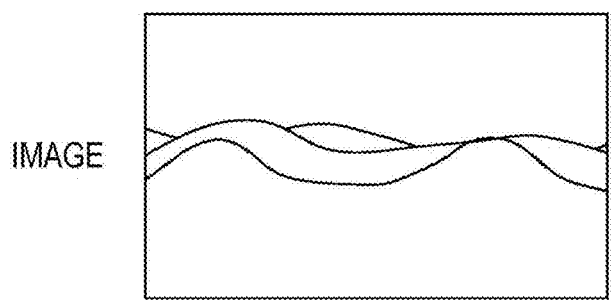
FIG. 12 is a view illustrating an example of a landscape as a scene of an image.
Figure 12:
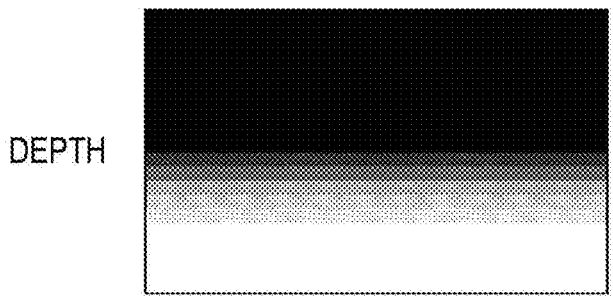
Figure 13:
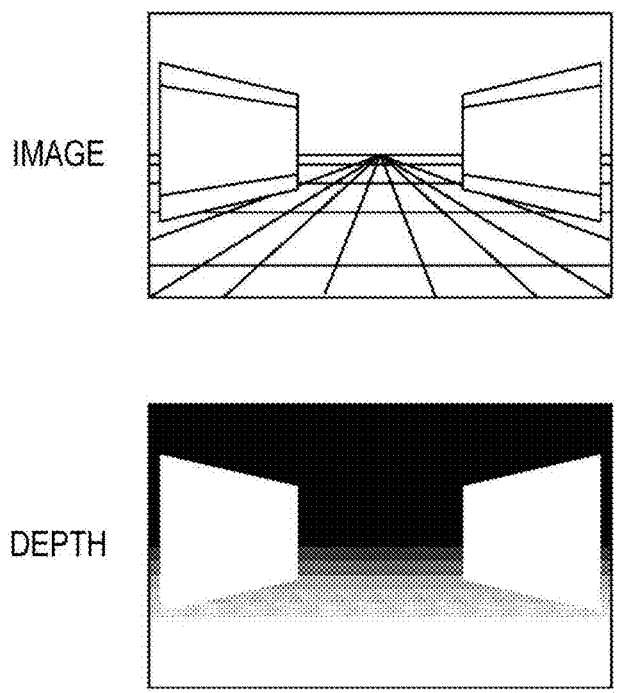
FIG. 13 is a view illustrating an example of a structure, a street and the like as the scene of the image.
Figure 14:
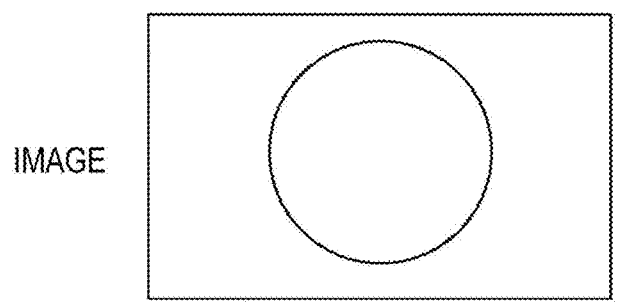
FIG. 14 is a view illustrating an example of a portrait as the scene of the image.
Figure 14:
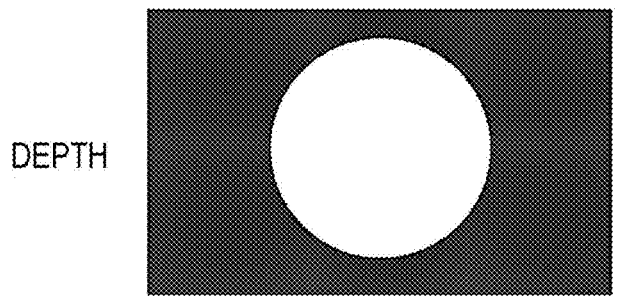

FIG. 12 is a view illustrating an example of the landscape as the scene of the image. In a case of the landscape, an entire image is the distant view and the foreground is not basically included. FIG. 13 is a view illustrating an example of the structure, the street and the like as the scene of the image. In this case, the vanishing point is often included in the street and the like and the structure often becomes the foreground. FIG. 14 is a view illustrating an example of the portrait as the scene of the image. In a case of the portrait, a person is included as the foreground and the background is often blurred.

The binding coefficient table 142 is the table which holds the integration coefficients of a plurality of stereoscopic effect emphasis processes such that they correspond to the scenes recognized by the scene recognition processing unit 141.

FIG. 15 is a view illustrating a configuration example of the binding coefficient table 142 of the embodiment of the present technology. The binding coefficient table 142 holds integration coefficients w1 to w7 for each of the above-described seven stereoscopic effect emphasis processes for each scene. The above-described three scenes of the landscape; the structure, the street and the like; and the portrait are illustrated.

The binding coefficient table 142 outputs the integration coefficients w1 to w7 of the stereoscopic effect emphasis processes to the scene indicated by the scene recognition processing unit 141. The coefficients created in advance by learning and the like are used, for example, as the integration coefficients w1 to w7 held by the binding coefficient table 142.

Figure 16:
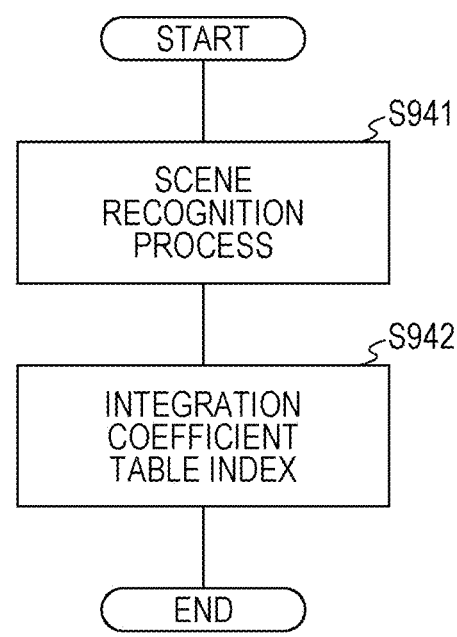
FIG. 16 is a flow diagram illustrating a procedure by the first configuration example of the image analyzing unit 140 of the embodiment of the present technology.

FIG. 16 is a flow diagram illustrating a procedure by the first configuration example of the image analyzing unit 140 of the embodiment of the present technology.

First, the scene recognition processing unit 141 recognizes the scene estimated from the input image (step S941). The binding coefficient table 142 is searched according to the recognized scene and the integration coefficients w1 to w7 of the stereoscopic effect emphasis processes are output (step S942).

Second Configuration Example of Image Analyzing Unit

Figure 17:
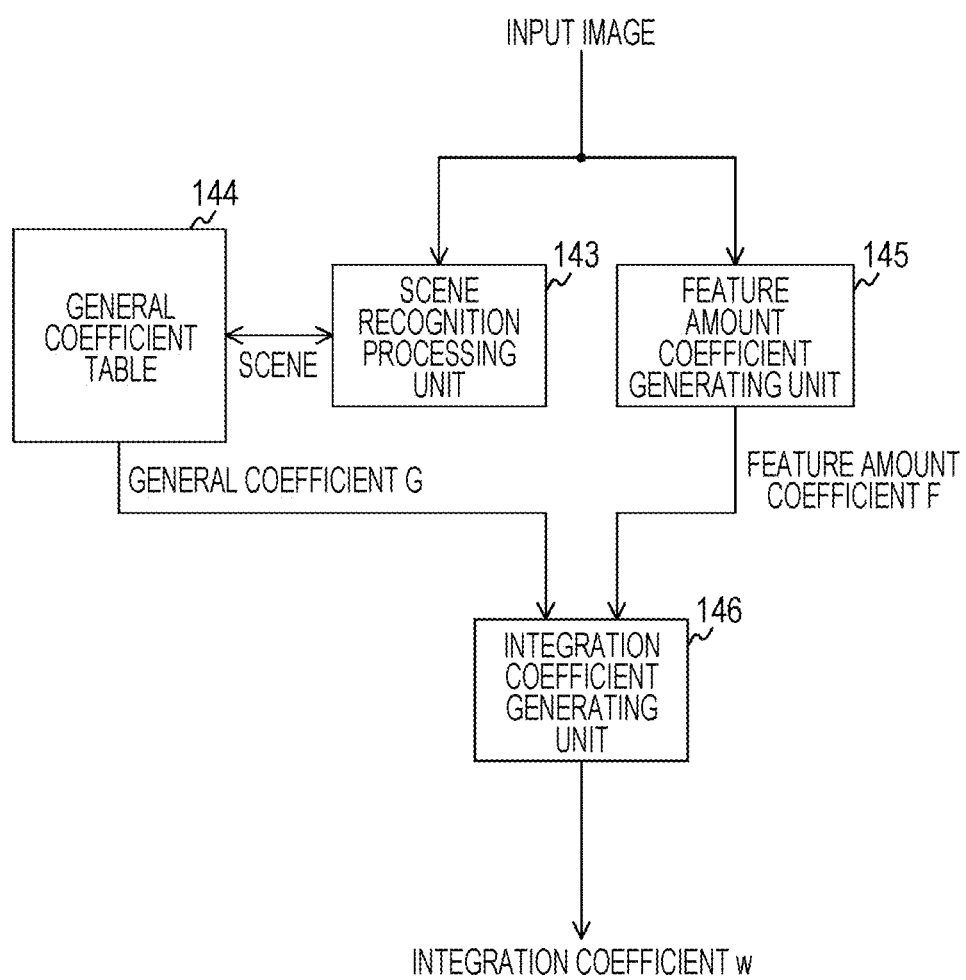
FIG. 17 is a view illustrating a second configuration example of the image analyzing unit 140 of the embodiment of the present technology.

FIG. 17 is a view illustrating a second configuration example of the image analyzing unit 140 of the embodiment of the present technology. The first configuration example of the image analyzing unit 140 is provided with a scene recognition processing unit 143, a general coefficient table 144, a feature amount coefficient generating unit 145, and a binding coefficient generating unit 146.

The scene recognition processing unit 143 is configured to recognize the scene estimated from the input image. The three scenes of the image of the landscape; the structure, the street and the like; and the portrait are supposed as in the first configuration example.

The general coefficient table 144 outputs general coefficients G1 to G7 of the stereoscopic effect emphasis processes according to the scene indicated by the scene recognition processing unit 143. The general coefficients G1 to G7 are comprehensive weight coefficients indicating a relationship among the respective stereoscopic effect emphasis processes.

The feature amount coefficient generating unit 145 is configured to generate feature amount coefficients F1 to F7 of the image from the input image. The feature amount coefficients F1 to F7 are the coefficients based on the feature amount of the image and are specifically obtained from a pixel value of the image, the feature amount of the image, and the depth of the depth information.

The binding coefficient generating unit 146 is configured to generate the integration coefficients w1 to w7 from the general coefficients G1 to G7 output from the general coefficient table 144 and the feature amount coefficients F1 to F7 generated by the feature amount coefficient generating unit 145 according to a next equation. That is to say, the next equation is satisfied among the integration coefficients w1 to w7, the general coefficients G1 to G7, and the feature amount coefficients F1 to F7.

$$wi = Gi \times Fi (i=1 \text{ to } 7)$$

Although only one set of binding coefficients may be prepared for one item of a scene recognition result in the above-described first configuration example, since the general coefficient by the scene recognition result is multiplied by the feature amount coefficient according to the second configuration example, a finer stereoscopic effect emphasis process may be performed for each image.

Herein, the feature amount coefficients F1 to F7 of the image generated by the binding coefficient generating unit 146 are described. As described above, the feature amount coefficients F1 to F7 are generated from the input image. A guideline when the feature amount coefficients F1 to F7 are generated for each of the above-described seven stereoscopic effect emphasis processes is hereinafter described.

An area ratio between the foreground being the processing target and another foreground is supposed, for example, as the image feature amount extracted for the stereoscopic effect emphasis process to control the relative sizes of the objects by the first emphasis processing unit 151. The feature amount coefficient F1 of the stereoscopic effect emphasis process is generated such that the sense of distance between the two objects is larger as the areas of the two regions are closer.

Presence of the vanishing point and the number of the straight lines forming the vanishing point are supposed as the image feature amount extracted for the stereoscopic effect emphasis process to control the position of the object based on the perspective by the second emphasis processing unit 152. When there is the vanishing point, the feature amount coefficient F2 is increased. When the number of the straight lines forming the vanishing point is larger than the predetermined number, the image feature amount F2 is increased, and when this is smaller, the feature amount coefficient F2 is decreased. That is to say, the number of the straight lines forming the vanishing point is used as an indication of reliability of the vanishing point.

A ratio between a size of the vector of the foreground and that of the background is supposed as the image feature amount extracted for the stereoscopic effect emphasis process to control the motion of the object by the third emphasis processing unit 153. The feature amount coefficient F3 of the stereoscopic effect emphasis process is generated such that the sense of distance between the foreground and the background is larger as the ratio between the vector of the foreground and that of the background is closer.

A value obtained by averaging average values of respective vertical lines of obtained gradients between adjacent pixels in the vertical direction of the depth information among the number of pixels in a horizontal direction is supposed as the image feature amount extracted for the stereoscopic effect emphasis process based on the aerial perspective by the fourth emphasis processing unit 154. When a line based on the gradient is drawn with the vertical direction and the depth direction plotted on an ordinate axis and an abscissa axis, respectively, a distance between the distant view and the near view is larger and a dynamic range in the depth direction becomes larger as the gradient is milder. Therefore, the feature amount coefficient F4 of the stereoscopic effect emphasis process is generated such that the distance between the positions of the distant view and the near view is emphasized as the gradient is smaller.

A gradient from a fine texture toward a rough texture in a texture detection result is supposed as the image feature amount extracted for the stereoscopic effect emphasis process to emphasize the texture gradient by the fifth emphasis processing unit 155. This gradient is the gradient of the feature amounts between a barycenter of the finest texture region and that of the roughest texture region of the two or more texture regions separated by a threshold. The feature amount coefficient F5 of the stereoscopic effect emphasis process is generated such that the depth is greater and this is more emphasized as the gradient is larger.

The number of cases in which absolute difference in the spatial direction of the depth information is not smaller than a threshold, that is to say, a target area is supposed as the image feature amount extracted for the stereoscopic effect emphasis process by shading by the sixth emphasis processing unit 156. The feature amount coefficient F6 of the stereoscopic effect emphasis process is generated such that the distance between the positions of the foreground and the background is larger and this is more emphasized as the target area is wider.

An area ratio of a distribution between the foreground and the background in a frequency distribution of the depth information is supposed as the image feature amount extracted for the stereoscopic effect emphasis process according to the focus by the seventh emphasis processing unit 157. For example, when the area of the foreground is wider than the area of the background, the presence of a main subject to be emphasized is estimated, so that the feature amount coefficient F7 of the stereoscopic effect emphasis process is generated such that this is emphasized.

Figure 18:
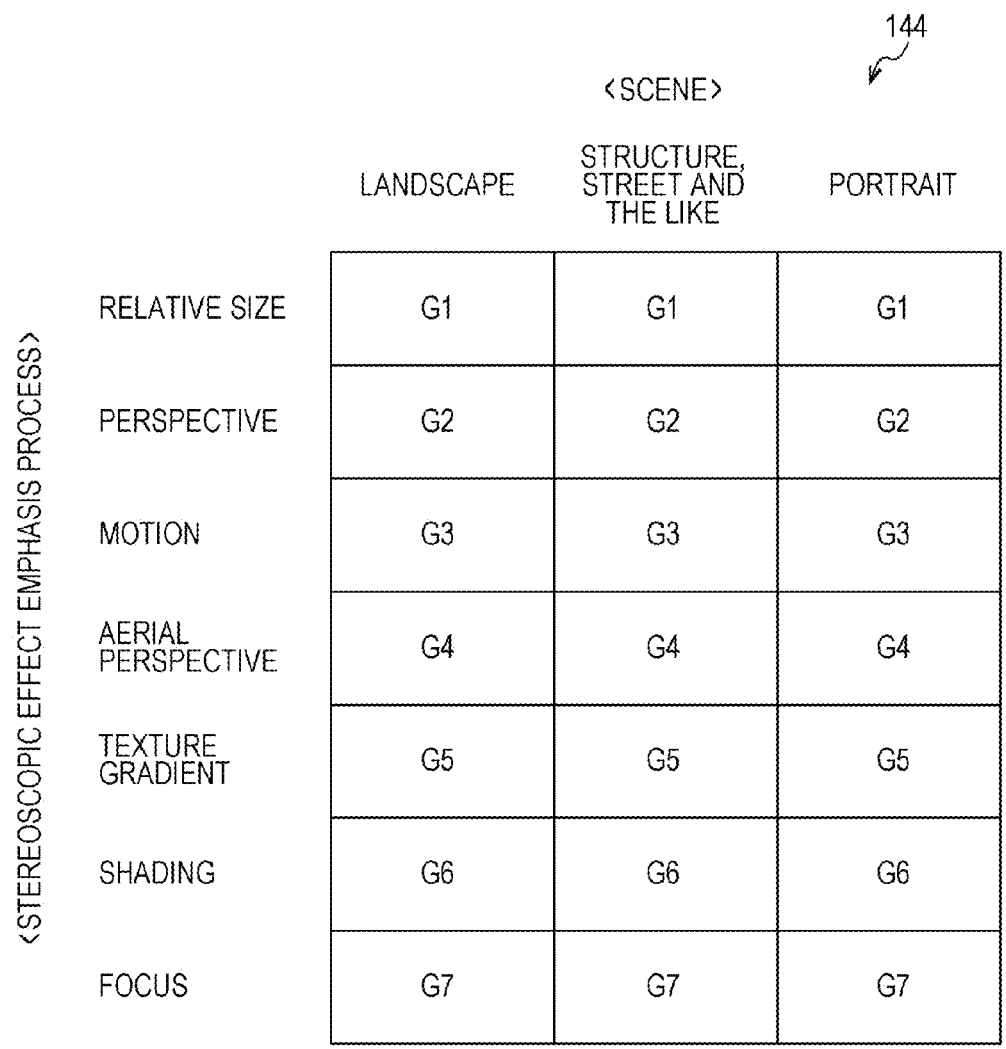
FIG. 18 is a view illustrating a configuration example of a general coefficient table 144 of the embodiment of the present technology.

FIG. 18 is a view illustrating a configuration example of the general coefficient table 144 of the embodiment of the present technology. The general coefficient table 144 holds the general coefficients G1 to G7 for each of the above-described seven stereoscopic effect emphasis processes for each scene. The above-described three scenes of the landscape; the structure, the street and the like; and the portrait are illustrated.

Figure 19:
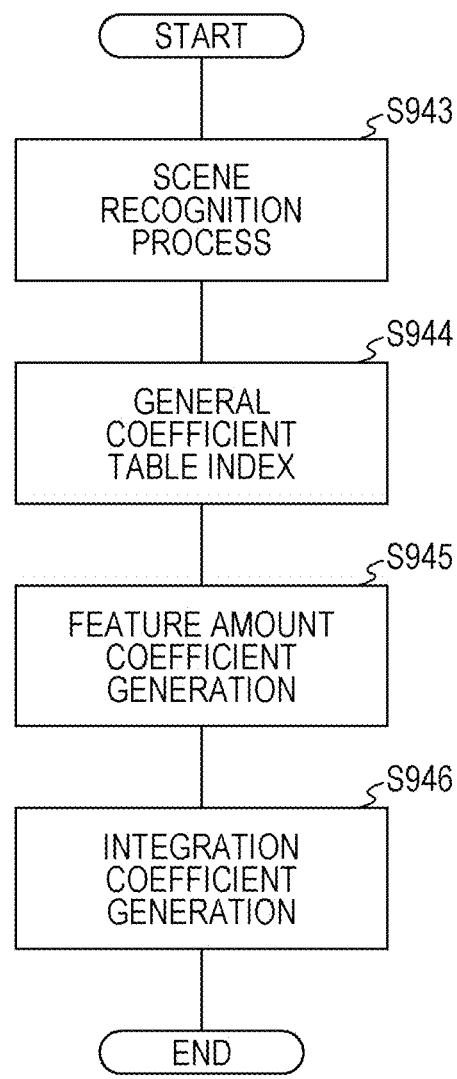
FIG. 19 is a flow diagram illustrating a procedure by the second configuration example of the image analyzing unit 140 of the embodiment of the present technology.

FIG. 19 is a flow diagram illustrating a procedure by the second configuration example of the image analyzing unit 140 of the embodiment of the present technology.

The scene recognition processing unit 143 first recognizes the scene estimated from the input image (step S943). Then, the general coefficient table 144 is searched according to the recognized scene and the general coefficients G1 to G7 of the stereoscopic effect emphasis processes are output (step S944).

The feature amount coefficient generating unit 145 generates the feature amount coefficients F1 to F7 of the image from the input image (step S945).

Then, the binding coefficient generating unit 146 generates the integration coefficients w1 to w7 from the general coefficients G1 to G7 output from the general coefficient table 144 and the feature amount coefficients F1 to F7 generated by the feature amount coefficient generating unit 145 (step S946).

Third Configuration Example of Image Analyzing Unit

Figure 20:
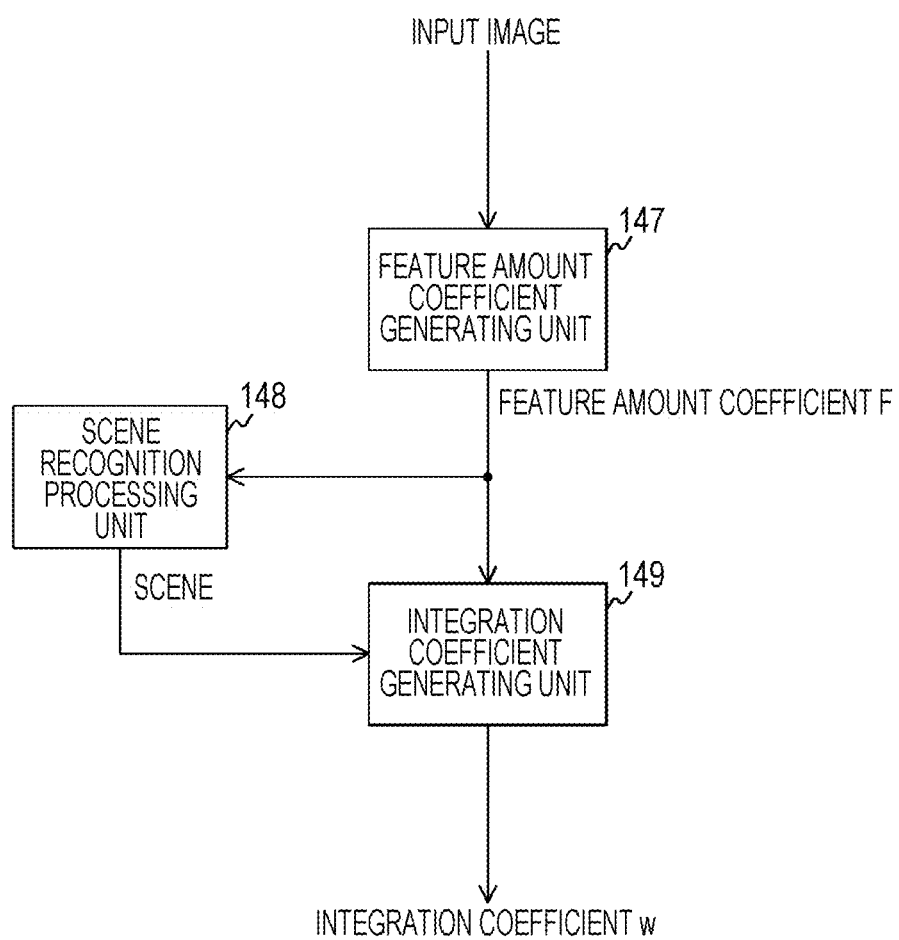
FIG. 20 is a view illustrating a third configuration example of the image analyzing unit 140 of the embodiment of the present technology.

FIG. 20 is a view illustrating a third configuration example of the image analyzing unit 140 of the embodiment of the present technology. The third configuration example of the image analyzing unit 140 is provided with a feature amount coefficient generating unit 147, a scene recognition processing unit 148, and a binding coefficient generating unit 149.

The feature amount coefficient generating unit 147 is configured to generate the feature amount coefficients F1 to F7 of the image from the input image. The feature amount coefficients F1 to F7 are the coefficients based on the feature amount of the image and are specifically obtained from a pixel value of the image, the feature amount of the image, and the depth of the depth information. Contents of the process by the feature amount coefficient generating unit 147 are similar to those of the above-described feature amount coefficient generating unit 145.

The scene recognition processing unit 148 is configured to estimate a specific scene based on the feature amount coefficients F1 to F7 generated by the feature amount coefficient generating unit 147. For example, when a weight of the aerial perspective is not smaller than a threshold, the image is estimated to be that of the landscape. When a weight of the perspective is not smaller than a threshold, the image is estimated to be that of the structure. When the weights of the aerial perspective and the perspective are not larger than the thresholds, the image is estimated to be that of the portrait.

The binding coefficient generating unit 149 is configured to adjust the feature amount coefficients F1 to F7 to generate the integration coefficients w1 to w7 according to the scene estimated by the scene recognition processing unit 148. For example, when the image is estimated to be that of the landscape, the integration coefficients w1, w2, and w6 of the stereoscopic effect emphasis processes of the relative size, the perspective, and the shading are inhibited and other integration coefficients are enhanced. When the image is estimated to be that of the structure, the integration coefficient w4 of the stereoscopic effect emphasis process of the aerial perspective is inhibited and other integration coefficients are enhanced. When the image is estimated to be that of the portrait, the integration coefficients w1 and w3 of the stereoscopic effect emphasis processes of the relative size and the motion are inhibited and other integration coefficients are enhanced.

Figure 21:
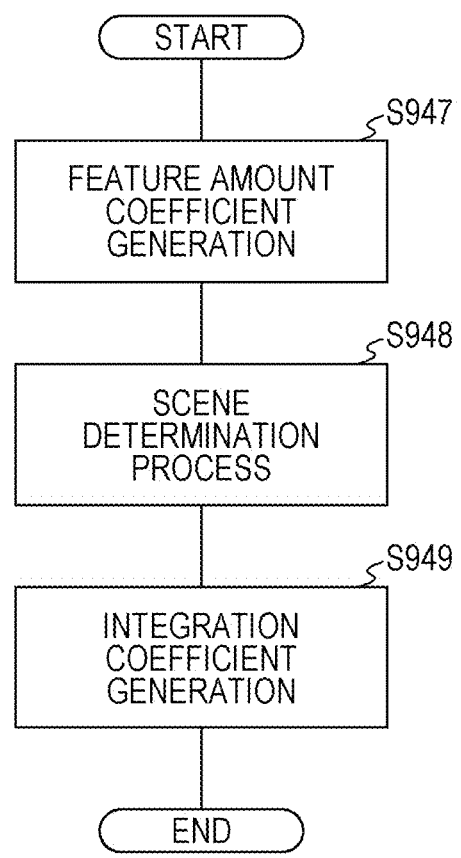
FIG. 21 is a flow diagram illustrating a procedure by the third configuration example of the image analyzing unit 140 of the embodiment of the present technology.

FIG. 21 is a flow diagram illustrating a procedure by the third configuration example of the image analyzing unit 140 of the embodiment of the present technology.

First, the feature amount coefficient generating unit 147 generates the feature amount coefficients F1 to F7 of the image from the input image (step S947). Then, the scene recognition processing unit 148 estimates the scene of the image based on the generated feature amount coefficients F1 to F7 (step S948). Thereafter, the binding coefficient generating unit 149 adjusts the feature amount coefficients F1 to F7 to generate the integration coefficients w1 to w7 according to the estimated scene (step S949).

Fourth Configuration Example of Image Analyzing Unit

Figure 22:
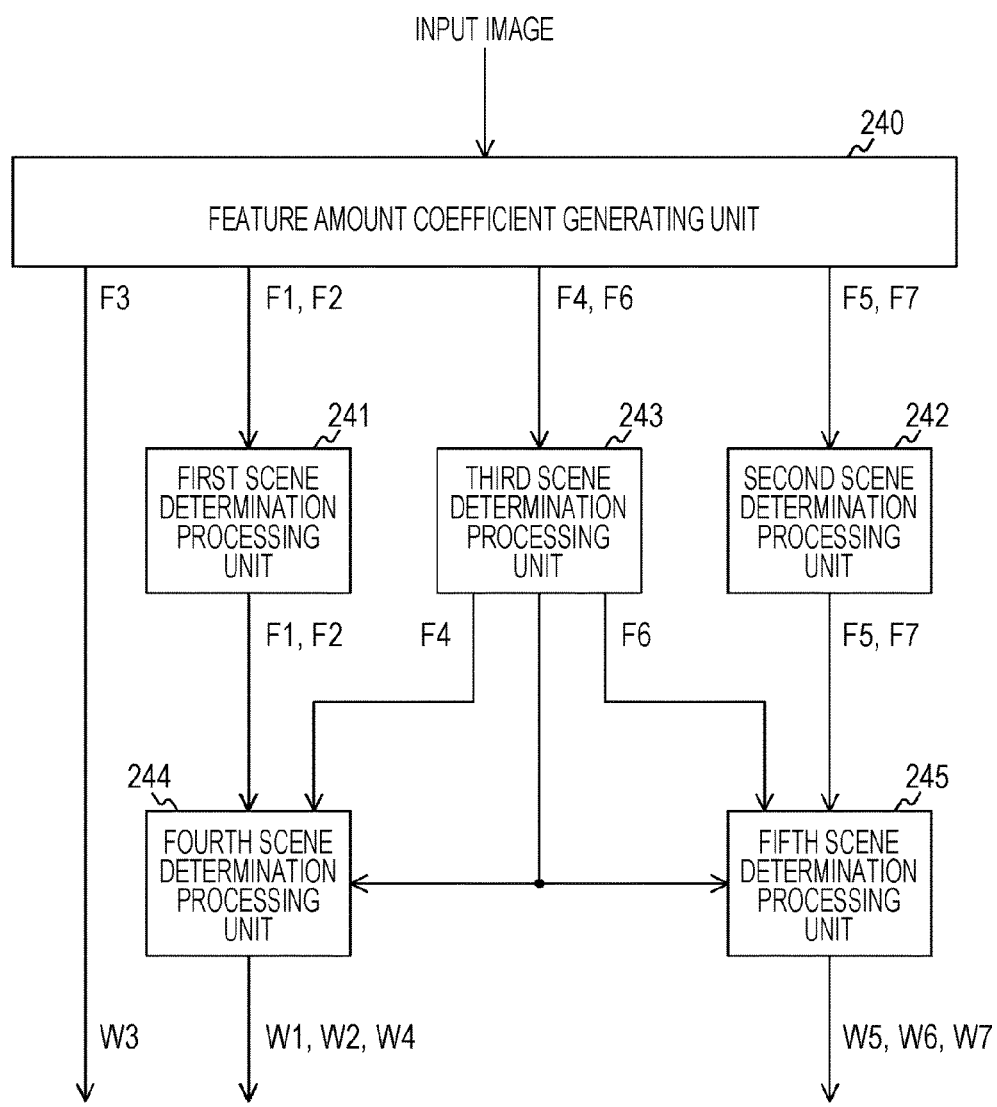
FIG. 22 is a view illustrating a fourth configuration example of the image analyzing unit 140 of the embodiment of the present technology.

FIG. 22 is a view illustrating a fourth configuration example of the image analyzing unit 140 of the embodiment of the present technology. The fourth configuration example of the image analyzing unit 140 is provided with a feature amount coefficient generating unit 240 and five scene determination processing units 241 to 245.

The feature amount coefficient generating unit 240 is configured to generate the feature amount coefficients F1 to F7 of the image from the input image. The feature amount coefficients F1 to F7 are the coefficients based on the feature amount of the image and are specifically obtained from a pixel value of the image, the feature amount of the image, and the depth of the depth information. The contents of the process by the feature amount coefficient generating unit 240 are similar to those of the above-described feature amount coefficient generating unit 145.

The scene determination processing units 241 to 245 are configured to determine whether the scene corresponds to the supposed scene based on the feature amount coefficients F1 to F7 generated by the feature amount coefficient generating unit 240, and when this corresponds, adjust the feature amount coefficients to output as the integration coefficients w1 to w7. Although the feature amount coefficients F1 to F7 are referred to and are adjusted to be output as the integration coefficients w1 to w7 in the following description, it may also be interpreted that the feature amount coefficients F1 to F7 generated by the feature amount coefficient generating unit 240 are referred to as the integration coefficients to be adjusted.

The first scene determination processing unit 241 is configured to refer to the feature amount coefficients F1 and F2 to determine whether the scene is the supposed scene. Herein, a scene in which a person is imaged with a deep background is supposed and it is determined whether a condition that the feature amount coefficient F1 is larger than a threshold Th1 and the feature amount coefficient F2 is larger than a threshold Th2 is satisfied. When the condition is satisfied, the feature amount coefficients F1 and F2 are increased. According to this, it becomes possible to emphasize the stereoscopic effect of the deep image.

The second scene determination processing unit 242 is configured to refer to the feature amount coefficients F5 and F7 to determine whether the scene is the supposed scene. Herein, a scene with a sharp texture gradient is supposed and it is determined whether a condition that the feature amount coefficient F5 is larger than a threshold Th5 and the feature amount coefficient F7 is larger than a threshold Th7 is satisfied. When the condition is satisfied, the feature amount coefficients F5 and F7 are increased. According to this, it becomes possible to emphasize the stereoscopic effect of the image with the sharp texture gradient. For example, an image in which a front side of lawns is in focus, an image of a person wearing patterned clothing, a brick house and the like might correspond to this.

The third scene determination processing unit 243 is configured to refer to the feature amount coefficients F4 and F6 to determine whether the scene is the supposed scene. The stereoscopic effect emphasis process based on the aerial perspective and the stereoscopic effect emphasis process by shading often conflict with each other, so that the feature amount coefficients F4 and F6 are compared with each other and an effect of the stereoscopic effect emphasis process with a smaller feature amount coefficient is inhibited. For example, when the feature amount coefficient F6 is smaller, the image is considered to be the landscape image, so that the feature amount coefficient F6 is further decreased such that the shading is not emphasized. When the feature amount coefficient F4 is smaller, the image is considered to be an indoor image or the portrait, so that the feature amount coefficient F4 is further decreased such that the stereoscopic effect emphasis process based on the aerial perspective is not emphasized. As a result of the determination by the third scene determination processing unit 243, when the feature amount coefficient F6 is smaller, a process by the fourth scene determination processing unit 244 is executed, and when the feature amount coefficient F4 is smaller, a process by the fifth scene determination processing unit 245 is executed.

The fourth scene determination processing unit 244 is configured to refer to the feature amount coefficients F1 or F2 and F4 to determine whether the scene is the supposed scene. Herein, the landscape image is supposed and the feature amount coefficients F1 or F2 and F4 are adjusted. When the feature amount coefficients F1 and F2 are increased by the first scene determination processing unit 241, an average value of them is used as a reference, and otherwise, a larger one of the feature amount coefficients F1 and F2 is used as the reference to be compared with the feature amount coefficient F4. When the feature amount coefficient F4 is larger, the object is considered to be located on the background side, so that the feature amount coefficients F1 and F2 are inhibited. On the other hand, when the feature amount coefficient F4 is smaller, the foreground object is considered to be located nearby, so that the feature amount coefficient F4 is inhibited.

The fifth scene determination processing unit 245 is configured to refer to the feature amount coefficients F5 or F7 and F6 to determine whether the scene is the supposed scene. Herein, the indoor image is supposed and the feature amount coefficients F5 or F7 and F6 are adjusted. When the feature amount coefficients F5 and F7 are increased by the second scene determination processing unit 242, an average value of them is used as the reference, and otherwise, a larger one of the feature amount coefficients F5 and F7 is used as the reference to be compared with the feature amount coefficient F6. When the feature amount coefficient F6 is larger, the image is considered to be a wide-angle image, so that the feature amount coefficients F5 and F7 are inhibited such that the shading is made sharper. On the other hand, when the feature amount coefficient F6 is smaller, the image is considered to be a micro image, so that the feature amount coefficient F6 is inhibited such that the edge is made sharper.

The feature amount coefficients F1 to F7 adjusted in this manner are supplied to the stereoscopic effect emphasis processing unit 150 and the integration processing unit 160 as the integration coefficients w1 to w7. Meanwhile, the feature amount coefficient F3 is directly supplied as the integration coefficient w3 without special adjustment in the fourth configuration example.

Figure 23:
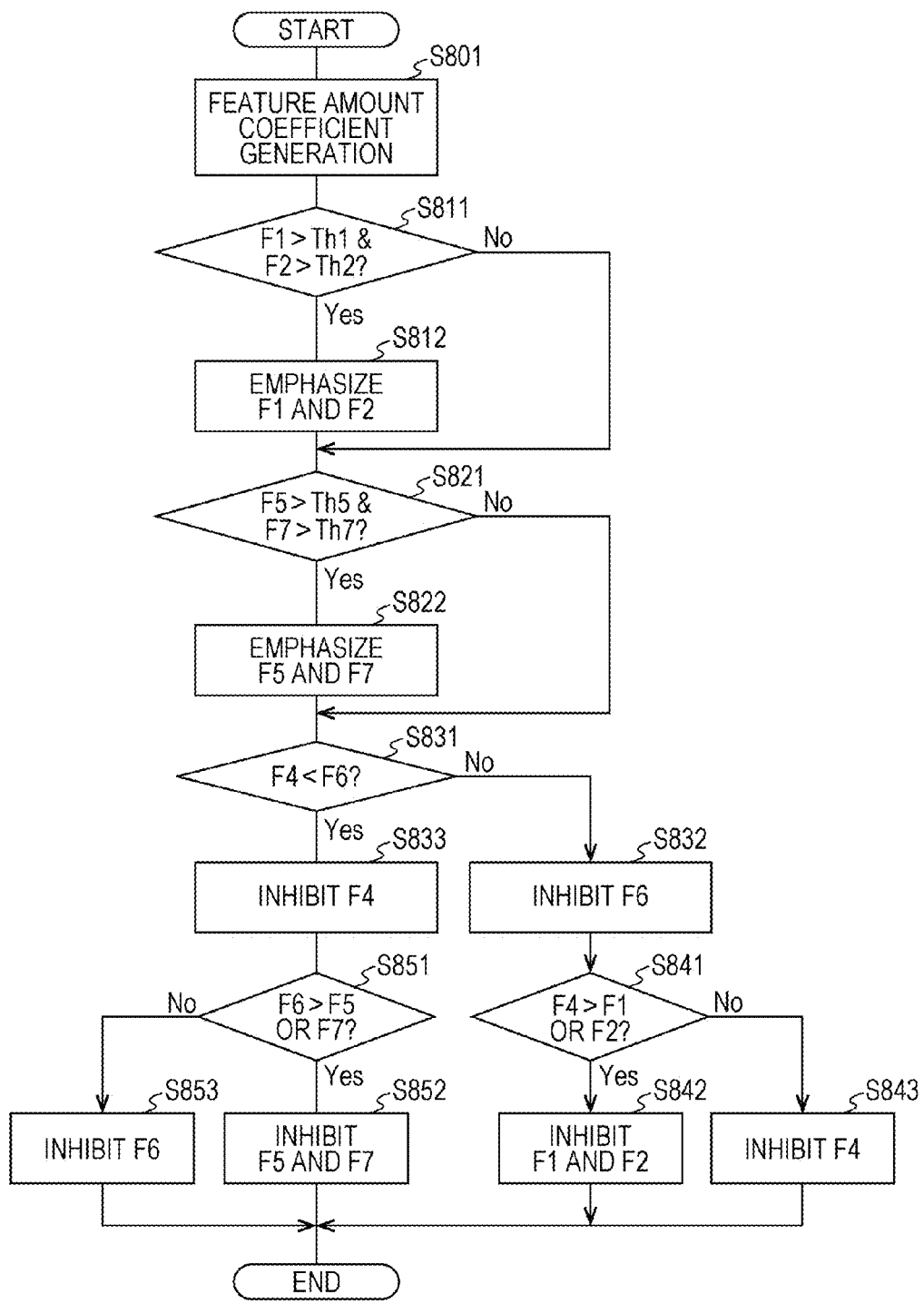
FIG. 23 is a flow diagram illustrating a procedure by the fourth configuration example of the image analyzing unit 140 of the embodiment of the present technology.

FIG. 23 is a flow diagram illustrating a procedure by the fourth configuration example of the image analyzing unit 140 of the embodiment of the present technology. First, the feature amount coefficient generating unit 240 generates the feature amount coefficients F1 to F7 of the image from the input image (step S801).

Then, the first scene determination processing unit 241 determines whether both the feature amount coefficients F1 and F2 are larger than the predetermined thresholds (step S811). That is to say, when the feature amount coefficient F1 is larger than the threshold Th1 and the feature amount coefficient F2 is larger than the threshold Th2 (Yes at step S811), the feature amount coefficients F1 and F2 are emphasized (step S812).

The second scene determination processing unit 242 determines whether both the feature amount coefficients F5 and F7 are larger than the predetermined thresholds (step S821). That is to say, when the feature amount coefficient F5 is larger than a threshold Th5 and the feature amount coefficient F7 is larger than a threshold Th7 (Yes at step S821), the feature amount coefficients F5 and F7 are emphasized (step S822).

Next, the third scene determination processing unit 243 determines a larger one of the feature amount coefficients F4 and F6 (step S831). At that time, when the feature amount coefficient F6 is determined to be larger (Yes at step S831), the feature amount coefficient F4 is inhibited (step S833). On the other hand, when the feature amount coefficient F4 is determined to be larger (No at step S831), the feature amount coefficient F6 is inhibited (step S832).

When the feature amount coefficient F6 is inhibited at step S832, the fourth scene determination processing unit 244 refers to the feature amount coefficients F1 or F2 and F4 to perform the following determination. That is to say, when the feature amount coefficients F1 and F2 are increased by the first scene determination processing unit 241, the average value of them is used as the reference, and otherwise, the larger one of the feature amount coefficients F1 and F2 is used as the reference to be compared with the feature amount coefficient F4 (step S841). When the feature amount coefficient F4 is larger (Yes at step S841), the feature amount coefficients F1 and F2 are inhibited (step S842). On the other hand, when the feature amount coefficient F4 is smaller (No at step S841), the feature amount coefficient F4 is inhibited (step S843).

On the other hand, when the feature amount coefficient F4 is inhibited at step S833, the fifth scene determination processing unit 245 refers to the feature amount coefficients F5 or F7 and F6 and performs the following determination. That is to say, when the feature amount coefficients F5 and F7 are increased by the second scene determination processing unit 242, the average value of them is used as the reference, and otherwise, the larger one of the feature amount coefficients F5 and F7 is used as the reference to be compared with the feature amount coefficient F6 (step S851). When the feature amount coefficient F6 is larger (Yes at step S851), the feature amount coefficients F5 and F7 are inhibited such that the shading is made sharper (step S852). On the other hand, when the feature amount coefficient F6 is smaller (No at step S851), the feature amount coefficient F6 is inhibited such that the edge is made sharper (step S853).

In this manner, in the fourth configuration example of the image analyzing unit 140, a more specific scene is estimated, the feature amount coefficients F1 to F7 are adjusted such that the stereoscopic effect emphasis process suitable for this is performed, and the integration coefficients w1 to w7 are generated based on this.

4. Integration Process

The stereoscopic effect emphasis processing unit 150 and the integration processing unit 160 perform the following processes according to the integration coefficients w1 to w7 generated by the above-described image analyzing unit 140.

Process of First Emphasis Processing Unit
(Relative Size)

As described above, the first emphasis processing unit 151 performs the stereoscopic effect emphasis process to control the relative sizes of the objects. The input image and the depth information are input as input information to the first emphasis processing unit 151. A coordinate of the region to be processed is input as the additional information. The integration coefficient w1 generated by the image analyzing unit 140 is input as the control parameter. A weight calculated from the area ratio between the objects may be reflected in the integration coefficient w1.

Figure 24:
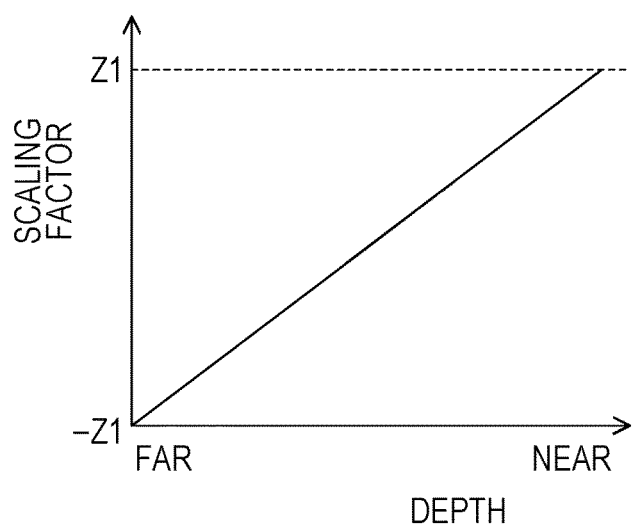
FIG. 24 is a view illustrating an example of a relationship between the depth and a scaling factor in the stereoscopic effect emphasis process to control the relative sizes of the objects by the first emphasis processing unit 151 of the embodiment of the present technology.

When the integration coefficient w1 is multiplied by a limit scaling factor z1 of enlargement or reduction obtained by the emphasis process, a final limit scaling factor z1×w1 is obtained. As illustrated in FIG. 24, a scaling factor Z1 changes according to the depth information of the region to be processed. In this drawing, a range of the scaling factor changes according to the integration coefficient w1. Therefore, it is possible to obtain the scaling factor Z1 from the integration coefficient w1 and the depth information.

The first emphasis processing unit 151 outputs the coordinate of the region to be processed and the scaling factor Z1 of enlargement or reduction as output information. This may also output the depth information and the integration coefficient w1.

Process of Second Emphasis Processing Unit
(Perspective)

As described above, the second emphasis processing unit 152 performs the stereoscopic effect emphasis process to control the position of the object based on the perspective. The input image and the depth information are input as the input information to the second emphasis processing unit 152. The coordinate of the vanishing point (presence thereof), the number of the straight lines forming the vanishing point, and the coordinate of the region to be processed are input as the additional information. The integration coefficient w2 generated by the image analyzing unit 140 is input as the control parameter. A weight calculated from the coordinate of the vanishing point (presence thereof) and the number of the straight lines forming the vanishing point may be reflected in the integration coefficient w2.

Figure 25:
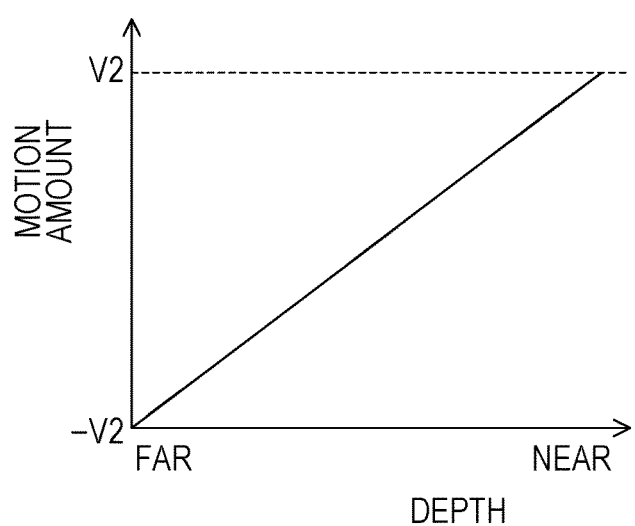
FIG. 25 is a view illustrating an example of a relationship between the depth and a motion amount in the stereoscopic effect emphasis process to control the position of the object based on the perspective by the second emphasis processing unit 152 of the embodiment of the present technology.

When the integration coefficient w2 is multiplied by a motion amount limit v2 obtained by the emphasis process, a final limit motion amount v2×w2 is obtained. As illustrated in FIG. 25, a motion amount V2 changes according to the depth information of the region to be processed. In this drawing, a range of the motion amount changes according to the integration coefficient w2. Therefore, it is possible to obtain the motion amount V2 from the integration coefficient w2 and the depth information.

The second emphasis processing unit 152 outputs the coordinate of the region to be processed and the motion amount V2 for perspective control as the output information. This may also output the depth information and the integration coefficient w2.

Process of Third Emphasis Processing Unit
(Motion of Object)

As described above, the third emphasis processing unit 153 performs the stereoscopic effect emphasis process to control the motion of the object. The input image and the depth information are input as the input information to the third emphasis processing unit 153. The motion vector of each region such as the foreground and the background and the coordinate of the region to be processed are input as the additional information. The integration coefficient w3 generated by the image analyzing unit 140 is input as the control parameter. A weight calculated from the ratio between the vector of the foreground and that of the background may be reflected in the integration coefficient w3.

Figure 26:
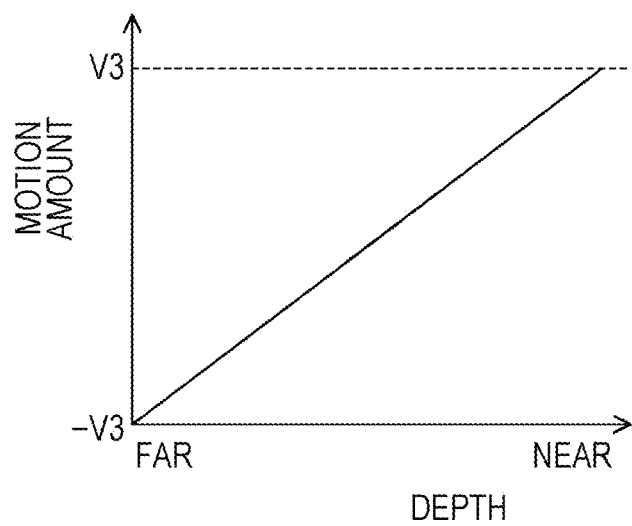
FIG. 26 is a view illustrating an example of the relationship between the depth and the motion amount in the stereoscopic effect emphasis process to control the motion of the object by the third emphasis processing unit 152 of the embodiment of the present technology.

When the integration coefficient w3 is multiplied by a motion amount limit v3 obtained by the emphasis process, a final limit motion amount v3×w3 is obtained. As illustrated in FIG. 26, a motion amount V3 changes according to the depth information of the region to be processed. In this drawing, a range of the motion amount changes according to the integration coefficient w3. Therefore, it is possible to obtain the motion amount V3 from the integration coefficient w3 and the depth information.

The third emphasis processing unit 153 outputs the coordinate of the region to be processed and the motion amount V3 for the stereoscopic effect emphasis by the motion as the output information. This may also output the depth information and the integration coefficient w3.

Process of Fourth Emphasis Processing Unit
(Aerial Perspective)

As described above, the fourth emphasis processing unit 154 performs the stereoscopic effect emphasis process based on the aerial perspective. The input image and the depth information are input as the input information to the fourth emphasis processing unit 154. The average value among the number of pixels in the horizontal direction of the average values of the respective vertical lines of the obtained gradients between the adjacent pixels in the vertical direction of the depth information is input as the additional information. The integration coefficient w4 generated by the image analyzing unit 140 is input as the control parameter. A weight calculated from the average value among the number of pixels in the horizontal direction of the average values of the respective vertical lines of the obtained gradients between the adjacent pixels in the vertical direction of the depth information may be reflected in the integration coefficient W4. If the vertical direction and the depth direction are plotted along the ordinate axis and the abscissa axis, respectively, the dynamic range in the depth direction becomes larger as the gradient is milder. In this case, since it is more desired to emphasize the aerial perspective as the gradient is milder, so that the weight is made larger.

As for pixel value control in the emphasis process, the integration coefficient w4 is multiplied by a processing result r4 and a final emphasis amount r4×w4 is obtained.

The fourth emphasis processing unit 154 outputs the emphasis processing result r4 of the aerial perspective as the output information. This may also output the depth information and the integration coefficient w4.

Process of Fifth Emphasis Processing Unit (Texture Gradient)

As described above, the fifth emphasis processing unit 155 performs the stereoscopic effect emphasis process to emphasize the texture gradient. The input image and the depth information are input as the input information to the fifth emphasis processing unit 155. The gradient from the fine texture toward the rough texture in the texture detection result is input as the additional information. The integration coefficient w5 generated by the image analyzing unit 140 is input as the control parameter. The gradient from the fine texture toward the rough texture in the texture detection result may be reflected in the integration coefficient w5. This gradient is obtained as the gradient of the feature amount between the barycenter of the finest texture region and that of the roughest texture region of the two or more texture regions separated by the threshold.

As for the pixel value control in the emphasis process, the integration coefficient w5 is multiplied by a processing result r5 and a final emphasis amount r5×w5 is obtained.

The fifth emphasis processing unit 155 outputs the emphasis processing result r5 of the texture gradient as the output information. This may also output the depth information and the integration coefficient w5.

Process of Sixth Emphasis Processing Unit (Shading)

As described above, the sixth emphasis processing unit 156 performs the stereoscopic effect emphasis process by shading. The input image and the depth information are input as the input information to the sixth emphasis processing unit 156. The number of the cases in which the absolute difference in the spatial direction of the depth information is not smaller than the threshold (or the target area) is input as the additional information. The integration coefficient w6 generated by the image analyzing unit 140 is input as the control parameter. A weight calculated from the number of the cases in which the absolute difference in the spatial direction of the depth information is not smaller than the threshold (or the target area) may be reflected in the integration coefficient w6.

As for the pixel value control in the emphasis process, the integration coefficient w6 is multiplied by an emphasis processing result r6 of the shading, and a final emphasis amount r6×w6 is obtained.

The sixth emphasis processing unit 156 outputs the emphasis processing result r6 of the shading as the output information. This may also output the depth information and the integration coefficient w6.

Process of Seventh Emphasis Processing Unit (Focus)

As described above, the seventh emphasis processing unit 157 performs the stereoscopic effect emphasis process according to the focus. The input image and the depth information are input as the input information to the seventh emphasis processing unit 157. An area ratio of the mountain between the foreground and the background in the frequency distribution of the depth information is input as the additional information. The integration coefficient w7 generated by the image analyzing unit 140 is input as the control parameter. A weight calculated from the area ratio of the mountain between the foreground and the background in the frequency distribution of the depth information may be reflected in the integration coefficient w7.

As for the pixel value control in the emphasis process, the integration coefficient w7 is multiplied by an emphasis processing result r7 of the focus, and a final emphasis amount r7×w7 is obtained.

The seventh emphasis processing unit 157 outputs the emphasis processing result r7 of the focus as the output information. This may also output the depth information and the integration coefficient w7.

Process of Integration Processing Unit 160

The process by the integration processing unit 160 is largely separated into an integration process of the control of the area or the position and the integration process of the control of the pixel value. The integration process of the control of the area or the position is to integrate the processing results of the first emphasis processing unit 151, the second emphasis processing unit 152, and the third emphasis processing unit 153. The integration process of the control of the pixel value is to integrate the processing results of the fourth emphasis processing unit 154, the fifth emphasis processing unit 155, the sixth emphasis processing unit 156, and the seventh emphasis processing unit 157.

Figure 27:
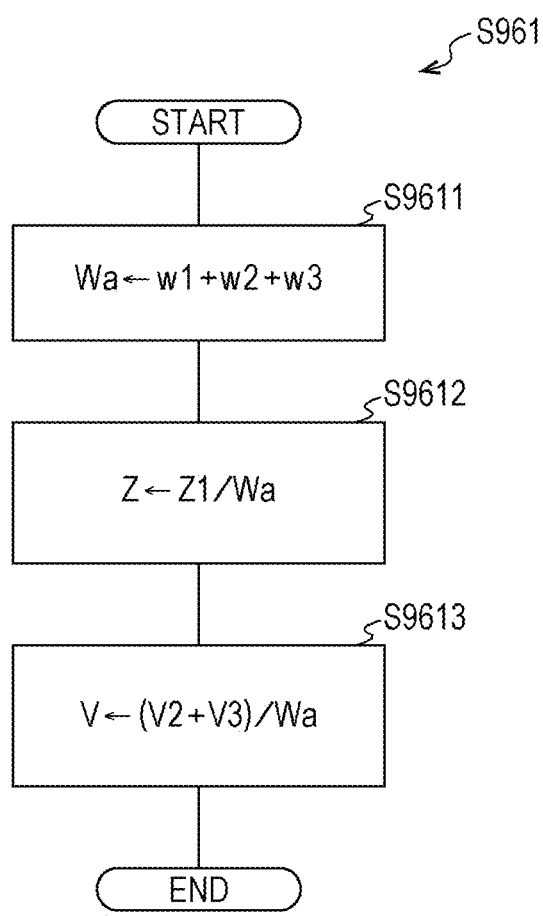
FIG. 27 is a view illustrating a procedure example of an integration process of control of an area or a position by an integration processing unit 160 of the embodiment of the present technology.

FIG. 27 is a view illustrating a procedure example of the integration process of the control of the area or the position by the integration processing unit 160 of the embodiment of the present technology.

First, a sum of the three integration coefficients w1 to w3 regarding the control of the area or the position is calculated as an integrated integration coefficient Wa (step S9611). Then, a value obtained by dividing the scaling factor Z1 of enlargement or reduction of the stereoscopic effect emphasis process to control the relative size by the first emphasis processing unit 151 by the integrated integration coefficient Wa is calculated as a final scaling factor Z of enlargement or reduction (step S9612). The motion amount V2 of the stereoscopic effect emphasis process to control the position of the object based on the perspective by the second emphasis processing unit 152 and the motion amount V2 of the stereoscopic effect emphasis process to control the motion of the object by the third emphasis processing unit 153 are added up (step S9613). Then, a value obtained by dividing an added result by the integrated integration coefficient Wa is calculated as a final motion amount V of the region (step S9613).

Meanwhile, when the control of the area or the position is performed on the image according to the scaling factor Z and the motion amount V finally obtained in this manner, the depth information and the additional information are also adjusted so as to correspond to this such that inconsistency is avoided.

Figure 28:
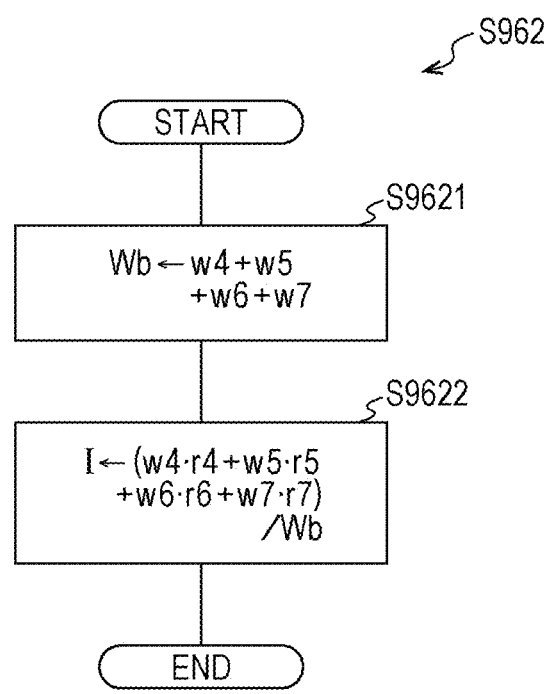
FIG. 28 is a view illustrating a procedure example of the integration process of the control of a pixel value by the integration processing unit 160 of the embodiment of the present technology.

FIG. 28 is a view illustrating a procedure example of the integration process of the control of the pixel value by the integration processing unit 160 of the embodiment of the present technology.

First, a sum of the four integration coefficients w4 to w7 regarding the control of the pixel value is calculated as an integrated integration coefficient Wb (step S9621). Then, values obtained by multiplying the processing results r4 to r7 by the fourth emphasis processing unit 154, the fifth emphasis processing unit 155, the sixth emphasis processing unit 156, and the seventh emphasis processing unit 157 by the integration coefficients w4 to w7 corresponding to them, respectively, are added up (step S9622). Then, a value obtained by dividing an added result by the integrated integration coefficient Wb is calculated as a final pixel value I (step S9622).

The integration process of the control of the area or the position and the integration process of the control of the pixel value herein described are different processes and the order of execution thereof is indifferent. However, it is required to perform a cascade process such that the one process is executed after the other process is completed.

5. Entire Operation

Entire operation of the image display device of the embodiment of the present technology heretofore described is hereinafter described.

Figure 29:
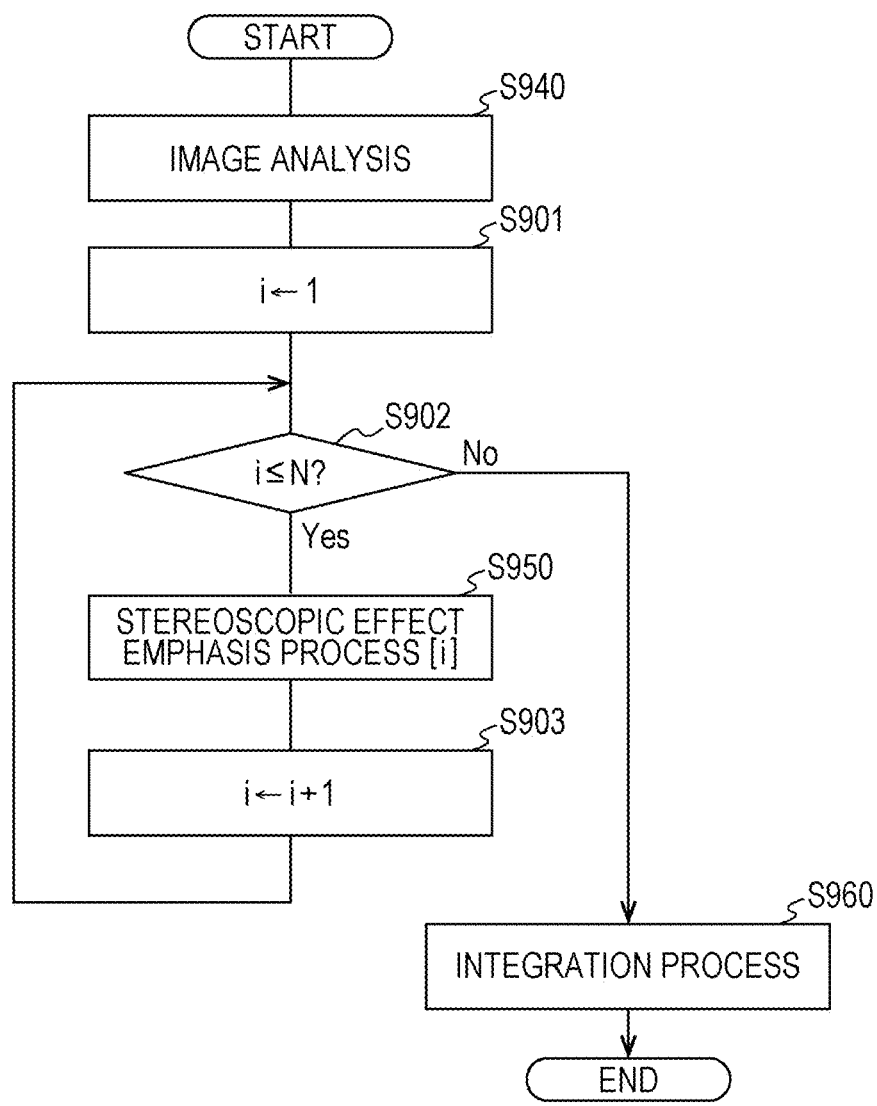
FIG. 29 is a view illustrating a first entire procedure example of the image display device of the embodiment of the present technology.

FIG. 29 is a view illustrating a first entire procedure example of the image display device of the embodiment of the present technology. In this example, the stereoscopic effect emphasis processes are sequentially executed in order.

The image analyzing unit 140 performs an image analysis process on the input image supplied from the input image supplying unit 110 (step S940). Then, a control variable i is set to "1" (step S901) and the stereoscopic effect emphasis processing unit 150 executes an i-th stereoscopic effect emphasis process (step S950) while the control variable i is incremented by "1" (step S903) until this becomes larger than N (step S902). Herein, N is an integer and is set to "7" in the above-described example. Thereafter, the integration processing unit 160 performs the integration process (step S960).

Figure 30:
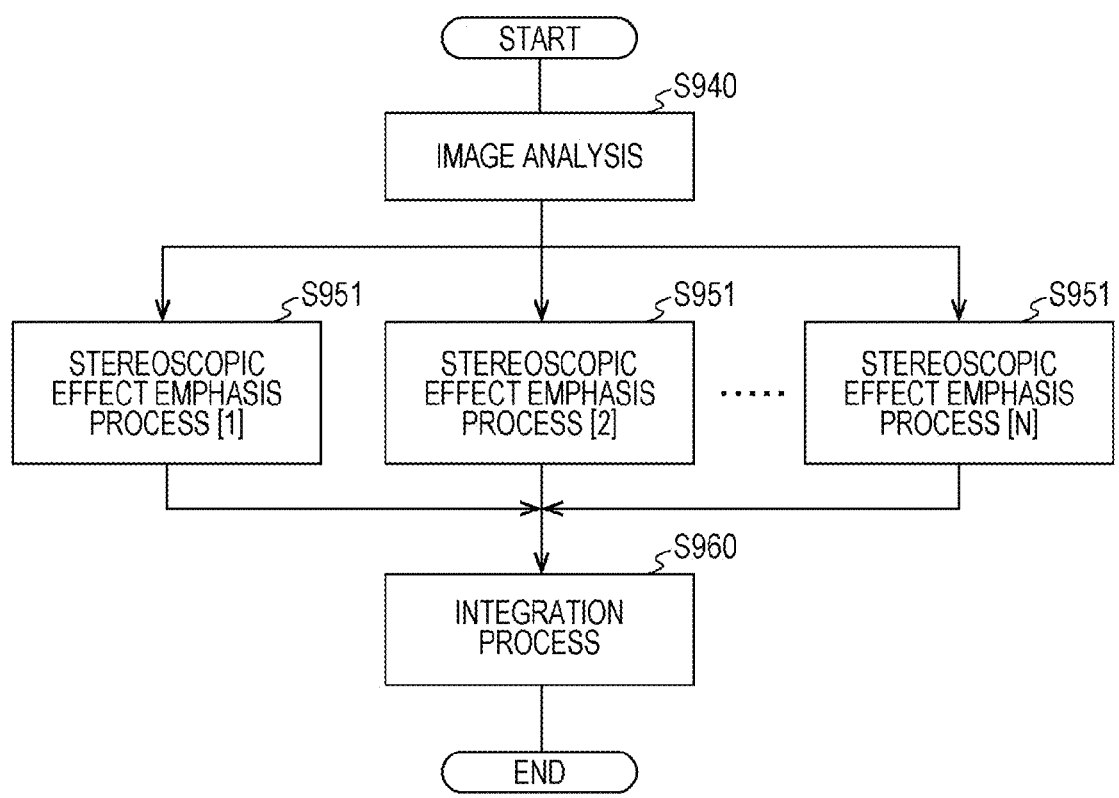
FIG. 30 is a view illustrating a second entire procedure example of the image display device of the embodiment of the present technology.

FIG. 30 is a view illustrating a second entire procedure example of the image display device of the embodiment of the present technology. In this example, the stereoscopic effect emphasis processes are executed in parallel regardless of the order.

The image analyzing unit 140 performs an image analysis process on the input image supplied from the input image supplying unit 110 (step S940). Then, the N stereoscopic effect emphasis processes are executed in parallel (step S951). Thereafter, the integration processing unit 160 performs the integration process (step S960).

Figure 31:
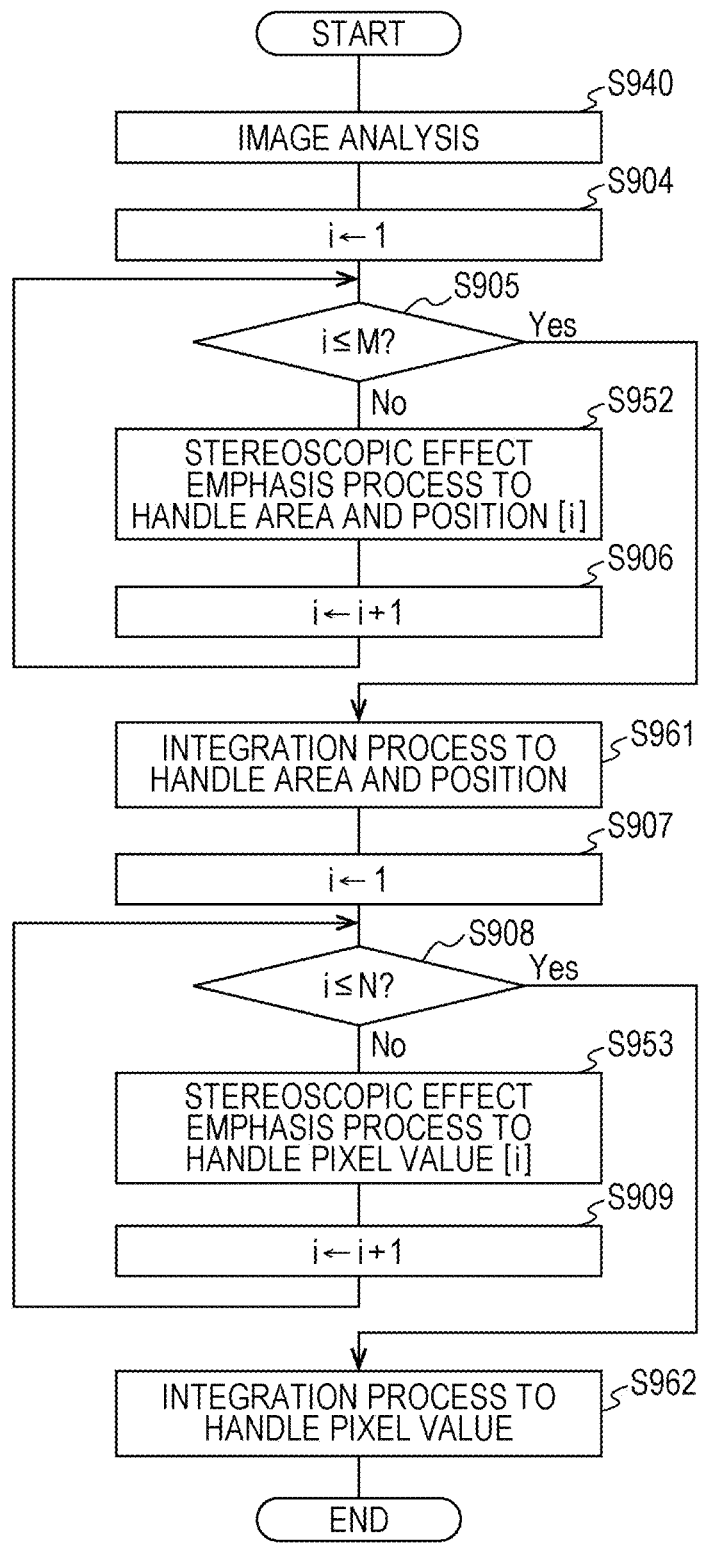
FIG. 31 is a view illustrating a third entire procedure example of the image display device of the embodiment of the present technology.

FIG. 31 is a view illustrating a third entire procedure example of the image display device of the embodiment of the present technology. This example clearly describes that the integration process of the control of the area or the position and the integration process of the control of the pixel value are separately performed.

The image analyzing unit 140 performs an image analysis process on the input image supplied from the input image supplying unit 110 (step S940). Then, the control variable i is set to "1" (step S904) and an i-th stereoscopic effect emphasis process regarding the control of the area or the position is executed (step S952) while the control variable i is incremented by "1" (step S906) until this becomes larger than M (step S905). Herein, M is an integer and is set to "3" in the above-described example. Thereafter, the integration processing unit 160 performs the integration process regarding the control of the area or the position (step S961).

Then, the control variable i is set to "1" (step S907), and an i-th stereoscopic effect emphasis process regarding the control of the pixel value is executed (step S953) while the control variable i is incremented by "1" (step S909) until this becomes larger than N (step S908). Herein, N is an integer and is set to "4" in the above-described example. Thereafter, the integration processing unit 160 performs the integration process regarding the control of the pixel value (step S962).

Figure 32:
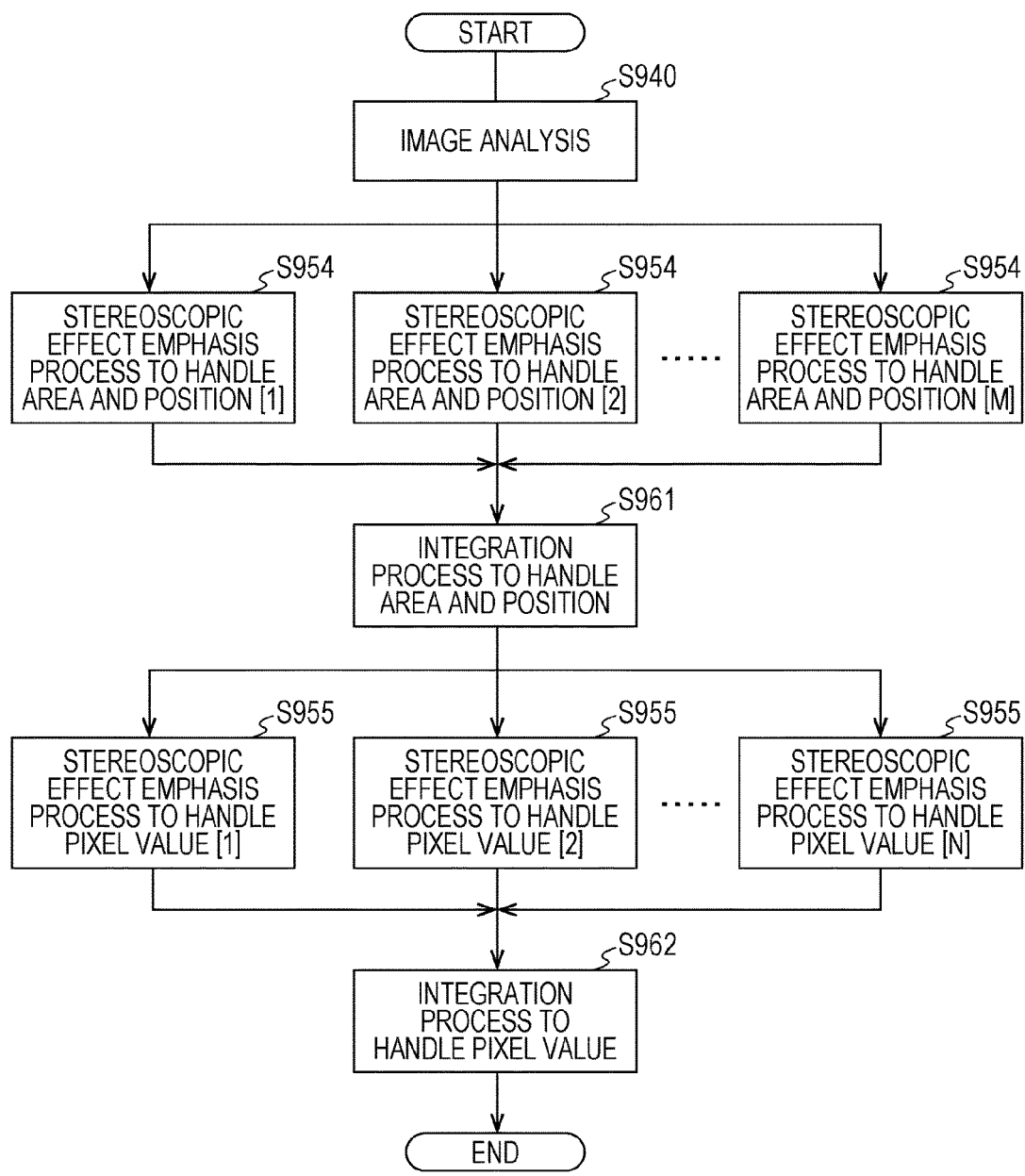
FIG. 32 is a view illustrating a fourth entire procedure example of the image display device of the embodiment of the present technology.

FIG. 32 is a view illustrating a fourth entire procedure example of the image display device of the embodiment of the present technology. This example clearly describes that the integration process of the control of the area or the position and the integration process of the control of the pixel value are separately performed and that the stereoscopic effect emphasis processes are executed in parallel regardless of the order.

The image analyzing unit 140 performs an image analysis process on the input image supplied from the input image supplying unit 110 (step S940). Then, the M stereoscopic effect emphasis processes regarding the control of the area or the position are executed in parallel (step S954). Thereafter, the integration processing unit 160 performs the integration process regarding the control of the area or the position (step S961).

Then, the N stereoscopic effect emphasis processes regarding the control of the pixel value are executed in parallel (step S955). Thereafter, the integration processing unit 160 performs the integration process regarding the control of the pixel value (step S962).

Although the example in which the integration process of the control of the area or the position and the integration process of the control of the pixel value are executed in series (FIG. 31) and the example in which they are executed in parallel (FIG. 32) are herein described, it is also possible to execute one of them in series and the other of them in parallel. The order of the integration process of the control of the area or the position and the integration process of the control of the pixel value may be changed. The process flow may be selected according to a mode of implementation of hardware or software.

In this manner, according to the embodiment of the present technology, the stereoscopic effect emphasis processes are integrated based on the integration coefficient generated by the image analyzing unit 140, so that it is possible to integrate a plurality of stereoscopic effect emphasis processes in a mode suitable for the image.

Meanwhile, the above-described embodiment describes an example of embodying the present technology, and there is a correspondence relationship between items of the embodiment and the matters specifying the invention in claims. Similarly, there is a correspondence relationship between the matters specifying the invention in claims and the items of the embodiment of the present technology having the same name. However, the present technology is not limited to the embodiment and may be embodied with various modifications of the embodiment without departing from the spirit thereof.

The procedures described in the above-described embodiment may be considered as a method having the series of procedures and may be considered as a program for allowing a computer to execute the series of procedures and a recording medium which stores the program. A CD (Compact Disc), an MD (MiniDisc), a DVD (digital versatile disk), a memory card, a Blu-ray (registered trademark) Disc and the like may be used, for example, as the recording medium.

Meanwhile, this technology may also have a following configuration.

(1) An image processing device including a stereoscopic effect emphasis processing unit which executes a plurality of stereoscopic effect emphasis processes on an input image, an image analyzing unit which analyzes the input image to generate an integration coefficient used when the plurality of stereoscopic effect emphasis processes is integrated, and an integration processing unit which integrates results of the plurality of stereoscopic effect emphasis processes according to the integration coefficient.

(2) The image processing device according to the (1), wherein the image analyzing unit recognizes a scene of the input image and generates the integration coefficient based on the recognized scene.

(3) The image processing device according to the (2), wherein the image analyzing unit includes a feature amount generating unit which generates a feature amount included in the input image and generates the integration coefficient based on the recognized scene and the feature amount.

(4) The image processing device according to any one of the (1) to (3), wherein, when the integration coefficient of a stereoscopic effect emphasis process to control a relative size and the integration coefficient of a stereoscopic effect emphasis process to perform positional control based on perspective are higher than predetermined thresholds, the image analyzing unit further increases the integration coefficient of the stereoscopic effect emphasis process to control the relative size and the integration coefficient of the stereoscopic effect emphasis process to perform the positional control based on the perspective.

(5) The image processing device according to any one of the (1) to (4), wherein, when the integration coefficient of a stereoscopic effect emphasis process to emphasize a texture gradient and the integration coefficient of a stereoscopic effect emphasis process according to a focus are higher than predetermined thresholds, the image analyzing unit further increases the integration coefficient of the stereoscopic effect emphasis process to emphasize the texture gradient and the integration coefficient of the stereoscopic effect emphasis process according to the focus.

(6) The image processing device according to any one of the (1) to (5), wherein the image analyzing unit inhibits a lower integration coefficient of the integration coefficient of a stereoscopic effect emphasis process based on aerial perspective and the integration coefficient of a stereoscopic effect emphasis process by shading.

(7) The image processing device according to any one of the (1) to (6), wherein the image analyzing unit inhibits a lower integration coefficient of the integration coefficient of the stereoscopic effect emphasis process by shading and the integration coefficient of the stereoscopic effect emphasis process to emphasize the texture gradient or the integration coefficient of the stereoscopic effect emphasis process according to the focus.

(8) The image processing device according to any one of the (1) to (7), wherein the image analyzing unit inhibits a lower integration coefficient of the integration coefficient of the stereoscopic effect emphasis process based on the aerial perspective and the integration coefficient of the stereoscopic effect emphasis process to control the relative size or the integration coefficient of the stereoscopic effect emphasis process to perform the positional control based on the perspective.

(9) The image processing device according to any one of the (1) to (8), wherein the integration processing unit separately performs integration of a stereoscopic effect emphasis processes regarding a position and integration of a stereoscopic effect emphasis processes regarding a pixel value of the plurality of stereoscopic effect emphasis processes in order.

(10) An image display device including a stereoscopic effect emphasis processing unit which executes a plurality of stereoscopic effect emphasis processes on an input image, an image analyzing unit which analyzes the input image to generate an integration coefficient used when the plurality of stereoscopic effect emphasis processes is integrated, an integration processing unit which integrates results of the plurality of stereoscopic effect emphasis processes according to the integration coefficient, and a display unit which displays an image obtained by integrating the results of the plurality of stereoscopic effect emphasis processes in the input image.

(11) An image processing method including a stereoscopic effect emphasis process step of executing a plurality of stereoscopic effect emphasis processes on an input image, an image analyzing step of analyzing the input image to generate an integration coefficient used when the plurality of stereoscopic effect emphasis processes is integrated, and an integration process step of integrating results of the plurality of stereoscopic effect emphasis processes according to the integration coefficient.

(12) A program which allows a computer to execute a stereoscopic effect emphasis process step of executing a plurality of stereoscopic effect emphasis processes on an input image, an image analyzing step of analyzing the input image to generate an integration coefficient used when the plurality of stereoscopic effect emphasis processes is integrated, and an integration process step of integrating results of the plurality of stereoscopic effect emphasis processes according to the integration coefficient.

REFERENCE SIGNS LIST

110 Input image supplying unit
120 Depth information obtaining unit
130 Additional information obtaining unit
140 Image analyzing unit
141,143,148 Scene recognition processing unit
142 Binding coefficient table
144 General coefficient table
145,147 Feature amount coefficient generating unit
146,149 Binding coefficient generating unit
150 Stereoscopic effect emphasis processing unit
151 to 157 Emphasis processing unit
160 Integration processing unit
170 Display unit
240 Feature amount coefficient generating unit
241 to 245 Scene determination processing unit

The invention claimed is:
1. An image processing device, comprising:
circuitry configured to:

execute a plurality of stereoscopic effect emphasis processes on an input image; and integrate results of the plurality of stereoscopic effect emphasis processes based on an integration coefficient among a plurality of integration coefficients used in an event the plurality of stereoscopic effect emphasis processes are integrated, wherein the input image is analyzed to obtain the integration coefficient, wherein, in an event a first integration coefficient of a first stereoscopic effect emphasis process to control a relative size and a second integration coefficient of a second stereoscopic effect emphasis process to control position of an object based on perspective are higher than determined thresholds, the circuitry is further configured to increase the second integration coefficient of the second stereoscopic effect emphasis process to control the position of the object.

2. The image processing device according to claim 1, wherein the circuitry is further configured to analyze the input image to generate the integration coefficient used in an event the plurality of stereoscopic effect emphasis processes are integrated.

3. The image processing device according to claim 2, wherein the circuitry is further configured to generate the integration coefficient based on a scene recognized from the input image.

4. The image processing device according to claim 3, wherein the circuitry is further configured to generate the integration coefficient based on the recognized scene and a feature amount included in the input image.

5. The image processing device according to claim 1, wherein, in an event a third integration coefficient of a third stereoscopic effect emphasis process to emphasize a texture gradient and a fourth integration coefficient of a fourth stereoscopic effect emphasis process based on a focus are higher than determined thresholds, the circuitry is further configured to increase the third integration coefficient of the stereoscopic effect emphasis process to emphasize the texture gradient and the fourth integration coefficient of the fourth stereoscopic effect emphasis process based on the focus.

6. The image processing device according to claim 1, wherein the circuitry is further configured to inhibit a lower integration coefficient of:

a third integration coefficient of a third stereoscopic effect emphasis process based on aerial perspective and a fourth integration coefficient of a fourth stereoscopic effect emphasis process based on a shading process.

7. The image processing device according to claim 1, wherein the circuitry is further configured to inhibit a lower integration coefficient of one of:

a third integration coefficient of a stereoscopic effect emphasis process based on a shading process and a fourth integration coefficient of a fourth stereoscopic effect emphasis process to emphasize a texture gradient, or a fifth integration coefficient of a fifth stereoscopic effect emphasis process based on a focus.

8. The image processing device according to claim 1, wherein the circuitry is further configured to inhibit a lower integration coefficient of one of:

a third integration coefficient of a third stereoscopic effect emphasis process based on aerial perspective and the first integration coefficient of the first stereoscopic effect emphasis process to control the relative size, or the second integration coefficient of the second stereoscopic effect emphasis process to control the position of the object based on the perspective.

9. The image processing device according to claim 1, wherein the circuitry is further configured to separately integrate the results of stereoscopic effect emphasis processes of the plurality of stereoscopic effect emphasis processes with respect to a position and the results of stereoscopic effect emphasis processes of the plurality of stereoscopic effect emphasis processes with respect to a pixel value in order.

10. The image processing device according to claim 1, wherein the circuitry is further configured to display an image obtained by integration of the results of the plurality of stereoscopic effect emphasis processes in the input image.

11. An image processing method, comprising:

executing a plurality of stereoscopic effect emphasis processes on an input image; and integrating results of the plurality of stereoscopic effect emphasis processes based on an integration coefficient among a plurality of integration coefficients used in an event the plurality of stereoscopic effect emphasis processes are integrated, the integration coefficient obtained by analyzing the input image, wherein, in an event a first integration coefficient of a first stereoscopic effect emphasis process to control a relative size and a second integration coefficient of a second stereoscopic effect emphasis process to control position of an object based on perspective are higher than determined thresholds, the second integration coefficient of the second stereoscopic effect emphasis process is increased.

12. The image processing device according to claim 1, wherein the circuitry is further configured to:

recognize a scene in the input image from a plurality of scenes of the input image; and search a binding coefficient table based on the recognized scene to generate the integration coefficient for each of the plurality of stereoscopic effect emphasis processes.

13. The image processing device according to claim 12, wherein the circuitry is further configured to output a plurality of general coefficients of the plurality of stereoscopic effect emphasis processes based on the recognized scene, wherein the plurality of general coefficients are weight coefficients that indicate a relationship among respective stereoscopic effect emphasis processes.

14. An image processing device, comprising:

circuitry configured to:

execute a plurality of stereoscopic effect emphasis processes on an input image; and integrate results of the plurality of stereoscopic effect emphasis processes based on an integration coefficient among a plurality of integration coefficients used in an event the plurality of stereoscopic effect emphasis processes are integrated, wherein the input image is analyzed to obtain the integration coefficient, wherein the circuitry is further configured to inhibit a lower integration coefficient of: a first integration coefficient of a first stereoscopic effect emphasis process based on aerial perspective and a second integration coefficient of a second stereoscopic effect emphasis process based on a shading process.

* * * * *